(12) United States Patent
Gupta

(10) Patent No.: US 8,959,347 B2
(45) Date of Patent: Feb. 17, 2015

(54) METHODS AND SYSTEMS OF DATA SECURITY IN BROWSER STORAGE

(75) Inventor: Akhilesh Gupta, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

(21) Appl. No.: 13/433,067

(22) Filed: Mar. 28, 2012

(65) Prior Publication Data

US 2013/0054968 A1 Feb. 28, 2013

Related U.S. Application Data

(60) Provisional application No. 61/528,462, filed on Aug. 29, 2011.

(51) Int. Cl.
*H04L 29/06* (2006.01)
*G06F 21/00* (2013.01)
*H04L 9/32* (2006.01)

(52) U.S. Cl.
CPC .......... *H04L 9/3213* (2013.01); *H04L 63/0807* (2013.01); *H04L 63/0428* (2013.01)
USPC .............................................. 713/170; 726/2

(58) Field of Classification Search
CPC .............. H04L 9/3213; H04L 63/0807; H04L 63/0428; H04L 9/32
See application file for complete search history.

(56) References Cited

U.S. PATENT DOCUMENTS

| | | |
|---|---|---|
| 5,715,450 A | 2/1998 | Ambrose et al. |
| 5,821,937 A | 10/1998 | Tonelli et al. |
| 5,831,610 A | 11/1998 | Tonelli et al. |
| 5,873,096 A | 2/1999 | Lim et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,549,908 B1 | 4/2003 | Loomans |
| 6,553,563 B2 | 4/2003 | Ambrose et al. |
| 6,574,635 B2 | 6/2003 | Stauber et al. |
| 6,577,726 B1 | 6/2003 | Huang et al. |

(Continued)

FOREIGN PATENT DOCUMENTS

| | | |
|---|---|---|
| WO | WO/2012/048092 A2 | 4/2012 |
| WO | WO/2012/054309 A1 | 4/2012 |

*Primary Examiner* — Izunna Okeke

(74) *Attorney, Agent, or Firm* — Blakely, Sokoloff, Taylor & Zafman

(57) ABSTRACT

Mechanisms and methods are provided for managing OAuth access in a database network system, and extending the OAuth flow of authentication to securely store the OAuth encrypted refresh token in the storage available with current browsers or any other non-secure storage on user system.

12 Claims, 16 Drawing Sheets

(56) References Cited

U.S. PATENT DOCUMENTS

| | | |
|---|---|---|
| 6,604,117 B2 | 8/2003 | Lim et al. |
| 6,604,128 B2 | 8/2003 | Diec |
| 6,609,150 B2 | 8/2003 | Lee et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,356,482 B2 | 4/2008 | Frankland et al. |
| 7,590,685 B2 | 9/2009 | Palmeri et al. |
| 7,991,790 B2 | 8/2011 | Barker |
| 8,015,495 B2 | 9/2011 | Achacoso et al. |
| 8,078,620 B2 | 12/2011 | Dayon |
| 8,078,621 B2 | 12/2011 | Dayon |
| 8,082,249 B2 | 12/2011 | Dayon |
| 8,082,250 B2 | 12/2011 | Dayon |
| 8,082,251 B2 | 12/2011 | Dayon |
| 8,082,252 B2 | 12/2011 | Dayon |
| 8,082,253 B2 | 12/2011 | Dayon |
| 8,082,254 B2 | 12/2011 | Dayon |
| 8,131,821 B2 | 3/2012 | Dayon |
| 8,230,062 B2 | 7/2012 | Newton |
| 8,301,612 B2 | 10/2012 | Barker et al. |
| 8,312,047 B2 | 11/2012 | Barker et al. |
| 8,407,338 B2 | 3/2013 | Brady |
| 8,412,820 B2 | 4/2013 | Newton |
| 8,443,085 B2 | 5/2013 | Jensen-Horne et al. |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0168083 A1* | 8/2004 | Gasparini et al. ............ 713/201 |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0024609 A1 | 1/2009 | Barker et al. |
| 2009/0044020 A1* | 2/2009 | Laidlaw et al. ............... 713/176 |
| 2009/0049053 A1 | 2/2009 | Barker et al. |
| 2010/0017596 A1* | 1/2010 | Schertzinger ................. 713/155 |
| 2010/0088636 A1 | 4/2010 | Yerkes et al. |
| 2010/0205243 A1 | 8/2010 | Brady |
| 2010/0223467 A1 | 9/2010 | Dismore et al. |
| 2010/0250565 A1 | 9/2010 | Tobin et al. |
| 2010/0281039 A1 | 11/2010 | Dayon |
| 2010/0287503 A1 | 11/2010 | Dayon |
| 2011/0137940 A1 | 6/2011 | Gradin et al. |
| 2011/0197186 A1 | 8/2011 | Barker et al. |
| 2011/0214064 A1 | 9/2011 | Schneider et al. |
| 2011/0225119 A1 | 9/2011 | Wong et al. |
| 2011/0225232 A1 | 9/2011 | Casalaina et al. |
| 2011/0225233 A1 | 9/2011 | Casalaina et al. |
| 2011/0225495 A1 | 9/2011 | Casalaina et al. |
| 2011/0225500 A1 | 9/2011 | Casalaina et al. |
| 2011/0225506 A1 | 9/2011 | Casalaina et al. |
| 2011/0225525 A1 | 9/2011 | Chasman et al. |
| 2011/0231919 A1 | 9/2011 | Vangpat et al. |
| 2011/0238622 A1 | 9/2011 | Walters et al. |
| 2011/0246520 A1 | 10/2011 | Koister et al. |
| 2011/0246772 A1 | 10/2011 | O'Connor et al. |
| 2011/0247051 A1 | 10/2011 | Bulumulla et al. |
| 2011/0252314 A1 | 10/2011 | Barker et al. |
| 2011/0258225 A1 | 10/2011 | Taylor et al. |
| 2011/0258242 A1 | 10/2011 | Eidson et al. |
| 2011/0258628 A1 | 10/2011 | Devadhar |
| 2011/0264650 A1 | 10/2011 | Tobin et al. |
| 2011/0265066 A1 | 10/2011 | Fee et al. |
| 2011/0274258 A1 | 11/2011 | Casalaina et al. |
| 2011/0274261 A1 | 11/2011 | Casalaina et al. |
| 2011/0276580 A1 | 11/2011 | Press et al. |
| 2011/0276674 A1 | 11/2011 | Jensen-Horne et al. |
| 2011/0276693 A1 | 11/2011 | Jensen-Horne et al. |
| 2011/0276890 A1 | 11/2011 | Jensen-Horne et al. |
| 2011/0276892 A1 | 11/2011 | Jensen-Horne et al. |
| 2011/0276945 A1 | 11/2011 | Chasman et al. |
| 2011/0276946 A1 | 11/2011 | Pletter |
| 2011/0282908 A1 | 11/2011 | Fly et al. |
| 2011/0283110 A1 | 11/2011 | Dapkus et al. |
| 2011/0283181 A1 | 11/2011 | Waite et al. |
| 2011/0283267 A1 | 11/2011 | Waite et al. |
| 2011/0283356 A1 | 11/2011 | Fly et al. |
| 2011/0289140 A1 | 11/2011 | Pletter et al. |
| 2011/0289141 A1 | 11/2011 | Pletter et al. |
| 2011/0289425 A1 | 11/2011 | Pletter et al. |
| 2011/0289476 A1 | 11/2011 | Pletter et al. |
| 2011/0289479 A1 | 11/2011 | Pletter et al. |
| 2011/0289509 A1 | 11/2011 | Kothari et al. |
| 2011/0296336 A1 | 12/2011 | Law et al. |
| 2011/0296375 A1 | 12/2011 | Mooney |
| 2011/0296381 A1 | 12/2011 | Mooney |
| 2011/0302221 A1 | 12/2011 | Tobin et al. |
| 2011/0302277 A1 | 12/2011 | Baker |
| 2011/0302631 A1 | 12/2011 | Sureshchandra et al. |

(56) References Cited

U.S. PATENT DOCUMENTS

| | | |
|---|---|---|
| 2011/0307695 A1 | 12/2011 | Slater |
| 2011/0320879 A1 | 12/2011 | Singh et al. |
| 2011/0320955 A1 | 12/2011 | O'Connor |
| 2012/0005537 A1 | 1/2012 | Chen et al. |
| 2012/0042218 A1 | 2/2012 | Cinarkaya et al. |
| 2012/0054210 A1 | 3/2012 | Dayon |
| 2012/0054629 A1 | 3/2012 | Dayon |
| 2012/0059919 A1 | 3/2012 | Glaser et al. |
| 2012/0066672 A1 | 3/2012 | Smith et al. |
| 2012/0078917 A1 | 3/2012 | Gradin et al. |
| 2012/0078981 A1 | 3/2012 | Gradin et al. |
| 2012/0079004 A1 | 3/2012 | Herman |
| 2012/0079038 A1 | 3/2012 | Hersh |
| 2012/0079392 A1 | 3/2012 | Dayon |
| 2012/0086544 A1 | 4/2012 | Kemp |
| 2012/0089610 A1 | 4/2012 | Agrawal et al. |
| 2012/0096046 A1 | 4/2012 | Kucera |
| 2012/0096049 A1 | 4/2012 | Reinke |
| 2012/0101985 A1 | 4/2012 | Kemp et al. |
| 2012/0102063 A1 | 4/2012 | Kemp et al. |
| 2012/0102114 A1 | 4/2012 | Dunn et al. |
| 2012/0102153 A1 | 4/2012 | Kemp et al. |
| 2012/0102402 A1 | 4/2012 | Kwong |
| 2012/0102420 A1 | 4/2012 | Fukahori |
| 2012/0102429 A1 | 4/2012 | Naderi et al. |
| 2012/0130973 A1 | 5/2012 | Tamm et al. |
| 2012/0140923 A1 | 6/2012 | Lee et al. |
| 2012/0143817 A1 | 6/2012 | Prabaker et al. |
| 2012/0143917 A1 | 6/2012 | Prabaker et al. |
| 2012/0144023 A1 | 6/2012 | Guest et al. |
| 2012/0144024 A1 | 6/2012 | Lee |
| 2012/0144340 A1 | 6/2012 | Knight |
| 2012/0144501 A1 | 6/2012 | Vangpat et al. |
| 2012/0173485 A1 | 7/2012 | Kothule et al. |
| 2012/0197916 A1 | 8/2012 | Tobin et al. |
| 2012/0198279 A1 | 8/2012 | Schroeder |
| 2012/0209947 A1 | 8/2012 | Glaser et al. |
| 2012/0214597 A1 | 8/2012 | Newman et al. |
| 2012/0214598 A1 | 8/2012 | Newman et al. |
| 2012/0215705 A1 | 8/2012 | Porro et al. |
| 2012/0215706 A1 | 8/2012 | Porro et al. |
| 2012/0215707 A1 | 8/2012 | Kwong et al. |
| 2012/0216130 A1 | 8/2012 | Porro et al. |
| 2012/0223951 A1 | 9/2012 | Dunn et al. |
| 2012/0233191 A1 | 9/2012 | Ramanujam |
| 2012/0253885 A1 | 10/2012 | Newton |
| 2012/0259894 A1 | 10/2012 | Varley et al. |
| 2012/0266229 A1* | 10/2012 | Simone et al. ................. 726/9 |
| 2012/0317238 A1 | 12/2012 | Beard |
| 2012/0330710 A1 | 12/2012 | Hauser et al. |
| 2012/0331016 A1 | 12/2012 | Janson et al. |
| 2012/0331053 A1 | 12/2012 | Dunn |
| 2012/0331518 A1 | 12/2012 | Lee |
| 2012/0331536 A1 | 12/2012 | Chabbewal et al. |
| 2013/0002676 A1 | 1/2013 | Ziemann |
| 2013/0007029 A1 | 1/2013 | Ziemann |
| 2013/0007049 A1 | 1/2013 | Ziemann |
| 2013/0007126 A1 | 1/2013 | Ziemann |
| 2013/0007148 A1 | 1/2013 | Olsen |
| 2013/0018869 A1 | 1/2013 | Hanson et al. |
| 2013/0018955 A1 | 1/2013 | Thaxton et al. |
| 2013/0019106 A1 | 1/2013 | Fischer |
| 2013/0019235 A1 | 1/2013 | Tamm |
| 2013/0021370 A1 | 1/2013 | Dunn et al. |
| 2013/0024454 A1 | 1/2013 | Dunn |
| 2013/0024511 A1 | 1/2013 | Dunn et al. |
| 2013/0024788 A1 | 1/2013 | Olsen et al. |
| 2013/0024843 A1 | 1/2013 | Kutlu |
| 2013/0024910 A1 | 1/2013 | Verma et al. |
| 2013/0031144 A1 | 1/2013 | Elango et al. |
| 2013/0031172 A1 | 1/2013 | Olsen et al. |
| 2013/0031487 A1 | 1/2013 | Olsen et al. |
| 2013/0036086 A1 | 2/2013 | Barker et al. |
| 2013/0036142 A1 | 2/2013 | Barker et al. |
| 2013/0054517 A1 | 2/2013 | Beechuk et al. |
| 2013/0054714 A1 | 2/2013 | Bedi |
| 2013/0054968 A1 | 2/2013 | Gupta |
| 2013/0055113 A1 | 2/2013 | Chazin et al. |
| 2013/0060859 A1 | 3/2013 | Olsen et al. |
| 2013/0061156 A1 | 3/2013 | Olsen et al. |
| 2013/0086670 A1 | 4/2013 | Vangpat et al. |
| 2013/0091149 A1 | 4/2013 | Dunn et al. |
| 2013/0091171 A1 | 4/2013 | Lee |
| 2013/0091217 A1 | 4/2013 | Schneider |
| 2013/0091229 A1 | 4/2013 | Dunn et al. |
| 2013/0097253 A1 | 4/2013 | Mencke |
| 2013/0103701 A1 | 4/2013 | Vishnubhatta et al. |
| 2013/0117353 A1 | 5/2013 | Wong et al. |
| 2013/0132861 A1 | 5/2013 | Kienzle et al. |
| 2013/0132870 A1 | 5/2013 | Vishnubhatta et al. |
| 2013/0145445 A1 | 6/2013 | Lee |

* cited by examiner

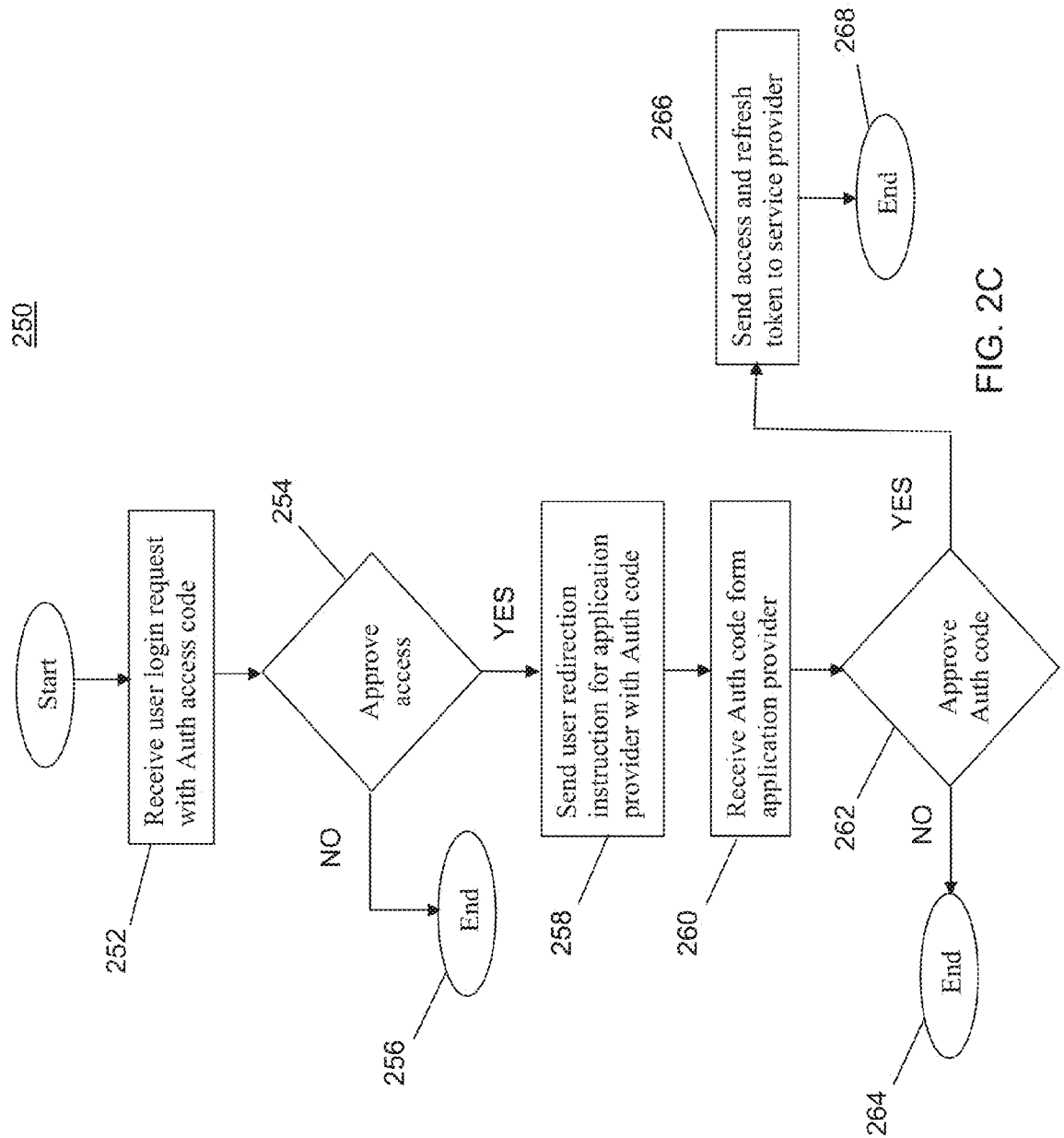

METHODS AND SYSTEMS OF DATA SECURITY IN BROWSER STORAGE

CLAIM OF PRIORITY

This application claims the benefit of U.S. Provisional Patent Application 61/528,462, entitled METHODS AND SYSTEMS FOR SECURE OAuth USING BROWSER STORAGE by Akhilesh Gupta, filed on Aug. 29, 2011, the entire contents of which are incorporated herein by reference.

CROSS REFERENCE TO RELATED APPLICATIONS

The following commonly owned, co-pending U.S. Patents and Patent Applications, including the present application, are related to each other. Each of the other patents/applications are incorporated by reference herein in its entirety: U.S. Provisional Patent Application 61/528,462, entitled "METHODS AND SYSTEMS FOR SECURE OAuth USING BROWSER STORAGE" by Akhilesh Gupta, filed on Aug. 29, 2011 the entire contents of which are incorporated herein by reference; and U.S. patent application Ser. No. 13/433,067, entitled "METHODS AND SYSTEMS OF DATA SECURITY IN BROWSER STORAGE" by Akhilesh Gupta, filed on Mar. 28, 2012, the entire contents of which are incorporated herein by reference.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to computer security.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Open Authorization (OAuth) is an open standard for providing third party access to a resource. OAuth provides a method for clients to access server resources on behalf of a resource owner (such as a different client or an end-user). OAuth provides a process for end-users to authorize third-party access to the end-user's server resources, without sharing the end-user's credentials (typically, a username and password pair), by using user-agent redirections. OAuth allows users to hand out tokens instead of credentials to their data hosted by a given service provider. Each token may grant access to a specific site for specific resources and for a defined duration, which allows a user to grant a third party site access to their information stored with another service provider, without sharing their access permissions or the full extent of their data.

The widespread use of the Internet, as well as the globalization of business opportunities has presented the need to provide information sharing and controlled access between network resources. Accordingly, the present application recognizes that it may be desirable to provide techniques for extending the flow of authentication to the storage available with current browsers, in order to better secure information used for accessing and sharing network resources.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 2C shows a flowchart of an embodiment of a data source side method for conducting an OAuth session;

DETAILED DESCRIPTION

General Overview

Figure 1:
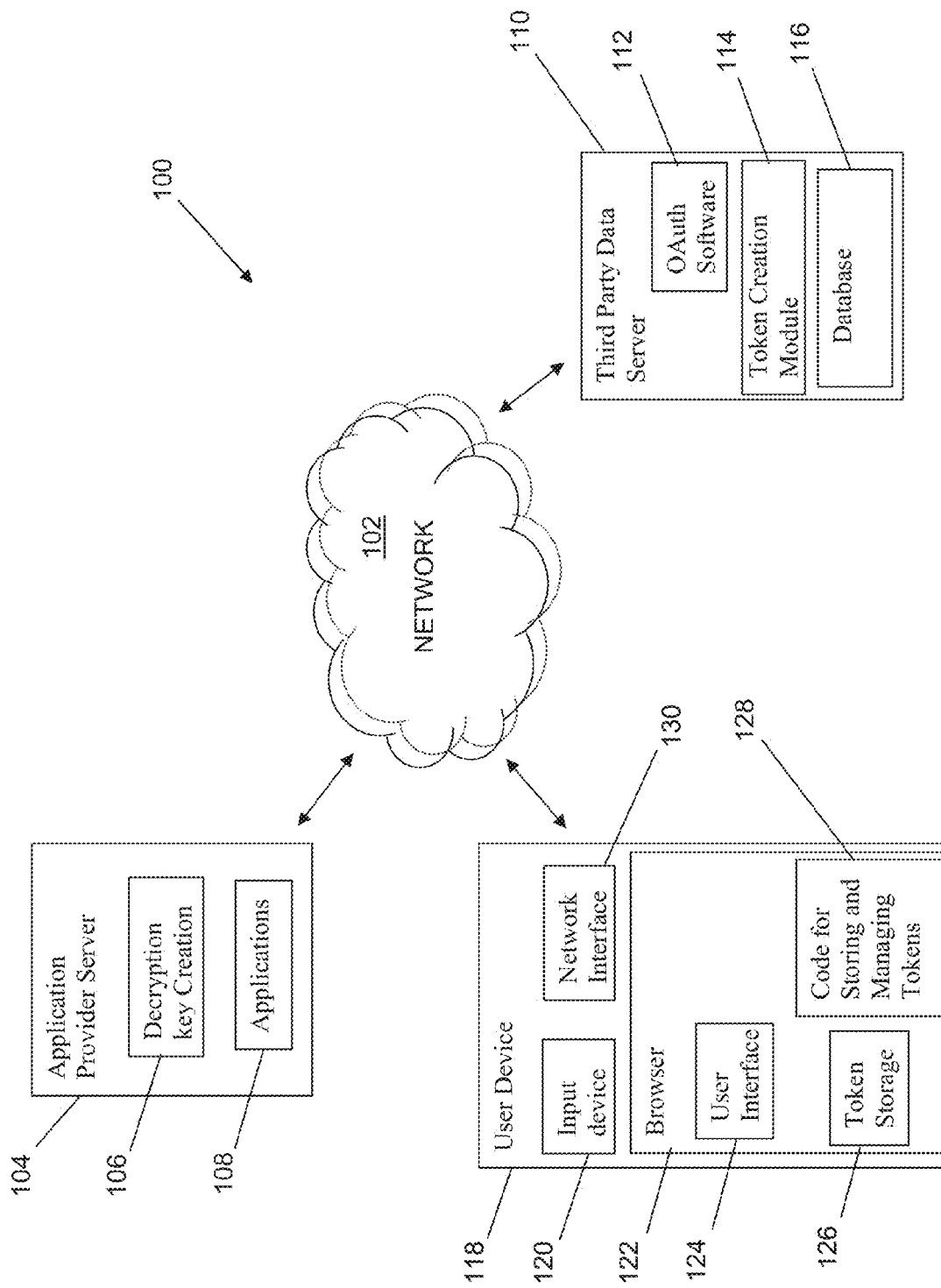
FIG. 1 shows a block diagram of an embodiment of a network based system demonstrating the interaction between a user system, an application server, and a third party data server.

Systems and methods are provided for managing OAuth access in a database network system, and extending the OAuth flow of authentication to securely store the OAuth refresh token in the storage available with browsers. Note that although various implementations are described in the context of a multi-tenant database network system (or multi-tenant database system), these and other implementations may also be utilized in other environments as well, for example, on-demand service environments, LAN systems, WAN systems, database systems, etc.

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

As used herein, the term multi-tenant database system refers to a database system that has multiple tenants that each has a degree of access to at least a portion of the database system that may or may not be the same as the degree of access as other tenants. Each tenant may be an individual or an organization that may have representatives, members, employees, customers and/or other entities associated with the tenant, which in turn, as a result of the tenancy of the tenant in the multitenant database, may also have different degrees of access to the database. The degree of access granted to those associated with the tenant and/or which entities (e.g., representatives, members, employees, customers and/or other entities) are associated with the tenant may be determined by the tenant. The database system may include multiple databases, and each database may be partitioned and/or otherwise shared amongst multiple tenants. The multitenant database may be provided on demand, that is as a service to the tenants, so that the tenants have use of the multitenant database for their own purposes that determined by the tenants, but the tenants do not need to worry about the maintaining the database, the operations of the database, or how the database works.

Embodiments provide a modification of the OAuth flow of authentication to securely store the OAuth refresh token designated for a user in the storage available with browsers on a user device. OAuth based authentication flows return a refresh token in response to a user initiated access session. The refresh token may be securely stored by a client site and by the user to easily and quickly access the third party services. However, storage features available with browsers on user systems lack encryption features or access to a device key-chain. The device key-chain refers to the chain of keys used for authentication. The absence or lack of security encryption features, for encrypting access tokens in device browsers, makes it easier for an undesired party to read use the data stored on browser devices, such as the access refresh tokens.

Embodiments may securely store the OAuth refresh token designated for a user in the storage available with browsers on a user access device that may be implemented within a system environment. The system environment may include a communication and/or computing device client browser, a service provider (SP)/Web application (app) host, and an identity provider/data source identity provider (the SP's host system may be referred to as the SP). Throughout this specification the term "host," "server," and "provider" may be substituted one for another to obtain different embodiments. Throughout this specification the terms "web application host," "application host," and "application server" may be substituted one for another to obtain different embodiments. Throughout this specification the terms "identity provider," "third party server," "information provider," and "data source" may be substituted one for another to obtain different embodiments. The SP may contact the identity provider in response to a user (client) initiated session to obtain data or content.

In at least one embodiment, when a user authenticates, via an identity provider, and grants permission for an SP to access the data and services of the identity provider, the identity provider redirects the user/client browser to an endpoint provided by the SP. During this redirect, the identity provider sends the authorization code, which can be exchanged by the SP for access and refresh tokens. When the client browser establishes communications with the SP endpoint, the SP prompts the user to set-up a passcode before obtaining the tokens. Once the user provides the passcode, and after the SP obtains the tokens from the identity provider, the SP encrypts the refresh token by using the user provided passcodes and/or by a private key generated by the SP. The encrypted result may also include a unique identifier that tracks future authentication requests, and acts to prevent brute force hacks characterized by repeated login attempts by an unauthorized party. The encrypted token is then returned to the client browser to be saved locally in the local storage of the browser. During future access attempts, the client browser may send this encrypted token along with the passcode to the SP to access the data and services of the identity provider.

Advantages provided by at least one embodiment of the modified OAuth are that the encryption and storage of the refresh token on the user device obviates the need for the user to authenticate via an identity provider every time the user employs the application. The browser storage may be used to store some or all the sensitive information on the client side, and hence reduce the risks on the SP side from the impact of having to store any sensitive user information. In general, throughout this specification, the browser local storage area may be a database and the Service Provider (SP) database may be replaced with another storage area at the SP. The modified OAuth may provide enhanced data security, because, in an instance of a lost user device, the token cannot be decrypted without manually inputting the user's passcode whenever a request for access is initiated, and the SP can prevent brute force attacks to guess the user's passcode. An instance of unauthorized access to an encrypted token at the user device would not be a cause of concern, since decryption of the token occurs on the SP side and the decryption key is stored as the SP.

FIG. 1 shows an embodiment of a network based system 100 demonstrating the interaction between an service provider server, an identity provider server, and a user system. Network based system 100 may include network 102, service provider server 104, key creation 106, application 108, identity provider server 110, OAuth software 112, token creation module 114, database 116, user system 118, input device/interface 120, browser 122, user interface 124, token storage 126, token management code 128, and network interface 130. In other embodiments network based system 100 may not have all of the elements or features listed and/or may have other elements or features instead of or in addition to those listed.

In network based system 100, the user system may allow the application provider server to access information stored at an identity provider server. The identity provider server may store information on behalf of the end user. Network 102 is any network, such as a Wide Area Network (WAN) or Local Area Network (LAN), such as Internet or an intranet.

In an embodiment, service provider server 104 provides a service or information to a user. Some non-limiting examples of a service provided by service provider server 104 may be photo printing of online digital photos or delivery of parcels. As another example, the host of service provider server 104 may provide a service to the user. For example, on behalf of the user, the host of the service provider server 104 may process the orders for products from customers for the users. The printing service (service provider 104) may access the photos (at identity provider server 110) in order to print the photos, and the delivery service (service provider 104) may access the server that stores the addresses (identity provider server 110).

Encryption/decryption algorithm 106 decrypts encrypted tokens, and encrypts tokens that have not yet been encrypted. Encryption/decryption algorithm 106 encrypts tokens prior to storing the encrypted token at the user machine and decrypts encrypted tokens prior to using the token to gain access to the identity provider server, allowing service provider server 104 to gain access to data on the identity provider server 110 on behalf of the user. Applications 108 may be the services provided by service provider server 104. Service provider server 104 may host encryption algorithm 106 and application 108. Both service provider server 104 and the user system have a client server relationship with identity provider service 110 in which identity provider service 110 is the server and service provider server 104 and the user system are the clients.

In an embodiment identity provider server 110 may provide content or data to be used by service provider server 104 on behalf of the user. Identity provider server 110 provides a service, and the user allows service provider server 104 to have access to identity provider server 110. Using photo-printing as an example again, identity provider server 110 may provide the photos or images to be printed by a printing application, which may be application 108 of the service provider server 104. OAuth software 112 is a module that runs the open authorization software, but could be replaced with another authorization software. Alternatively, identity provider server 110 may provide a service ordered by service provider server 104 to the user and/or to application provider 104 on behalf of the user. The OAuth software 112 manages the authentication process, which will be described further below. Token creation module 114 creates refresh tokens, which may be necessary to access identity provider server 110. Database 116 may be a database that tracks the accounts of users of identity provider server 110 and may be used by identity provider server for other purposes as well. Identity provider server 110 may host OAuth software 112, token creation module 114, and database 116. Database 116 may store the information, such as for example the photos that the service provider server 104 is requesting. In an embodiment, identity provider server 110 and/or database 116 may be part of an on-demand multi-tenant database system. Database 116 may be a multi-tenant relational database having different portions dedicated to different tenants. The identity provider server 110 may be considered an organization (org) or tenant in a multi-tenant database system to be described in greater detail below in conjunction with FIGS. 6 and 7.

In an embodiment user system 118 may be a computing device such as a desktop computer, laptop, tablet, or portable computing device. User system 118 may also be a mobile communication device such as a cellular phone or smart phone. Anywhere in this specification where the word "system" appears, the word "device" may be substituted to obtain a more specific embodiment. User system 118 may be the system of an end user that uses the services of service provider server 104 and identity provider server 110. User system 118 may desire to have service provider server 104 perform a function for which service server provider 104 needs to access the user's account at identity provider server 110. Input device 120 may be a keyboard, virtual keyboard, or a pointing device, such as a tack ball, touch pad, touch screen, or a mouse. Browser 122 may be an application for interacting with network resources over network 102. Browser 122 may be any markup language client or any client capable of rendering elements based on a markup language, such as an http client. In an embodiment browser 122 may include a database. In an embodiment, tokens may be stored in the local storage of the browser, in nonvolatile memory. User interface (UI) 124 may be a visual interactive webpage for inputting and receiving information over the network 102. User interface 124 may be a user interface that was downloaded from service provider server 104. Token storage 126 may be a storage area at the user system that stores tokens that were created by identity provider server 110. Token storage 126 may be nonvolatile memory and may be part of the local storage of the browser. Token storage 126 may store encrypted tokens, which may be created by identity provider server 126 and may be encrypted by service provider server 110. Token management code 128 controls the receipt, storage, and release of tokens within user system 118. Token management code 128 stores and manages tokens on user system 118. Token management code 128 may be included within browser 122. Network interface 130 is an interface to a network that allows user system 118 to interface with a network, such as the Internet. User system 118 may include input system 120, browser 122, user interface 124, token storage 126, token management code 128, and network interface 130.

Figure 2A:
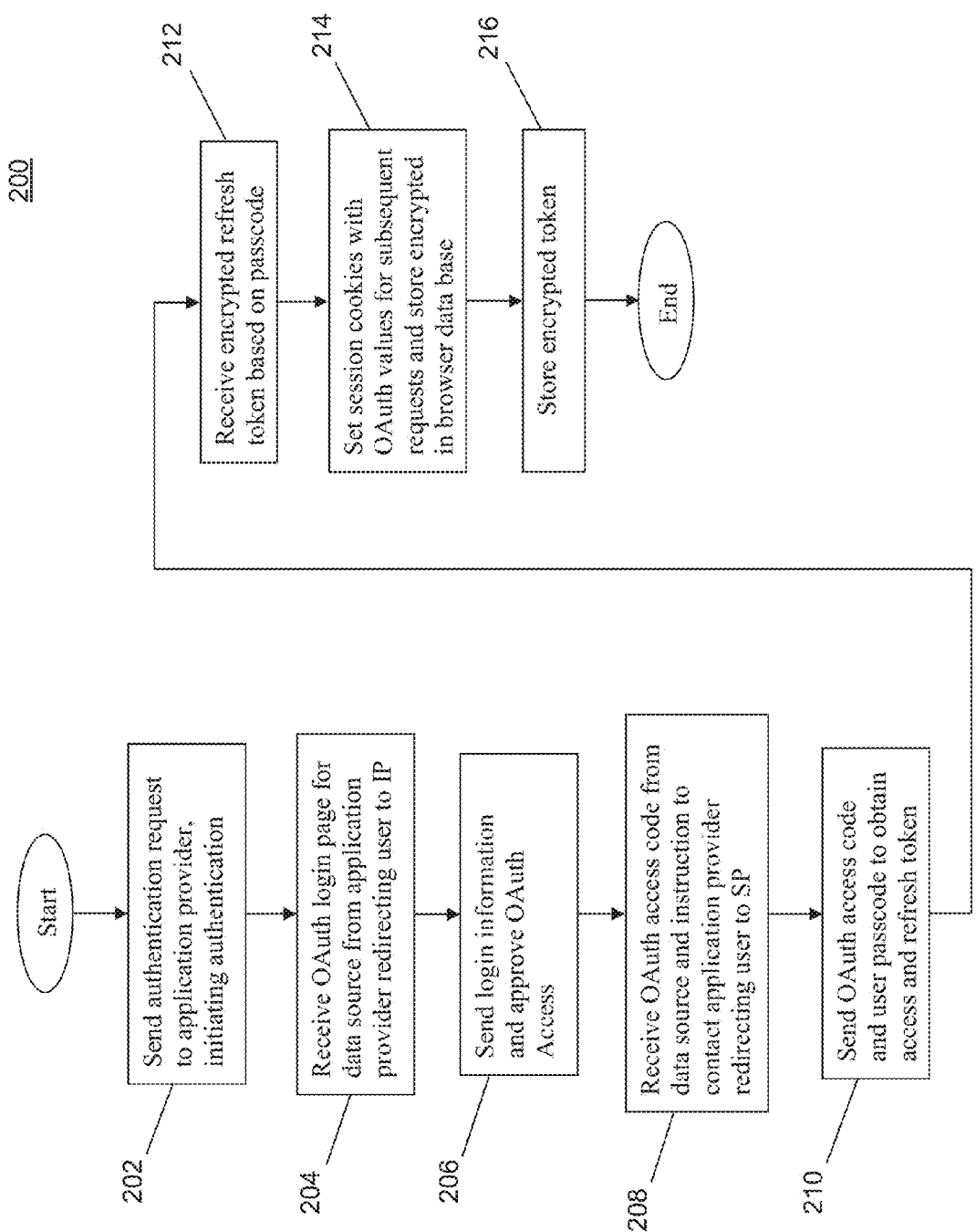
FIG. 2A shows a flowchart of an embodiment of a user system method for initiating an OAuth session and obtaining and storing an encrypted token in the user system browser.

User System Side Method for Initiating OAuth Session and Securing Encrypted Token on the User System Browser FIG. 2A shows a flowchart of an embodiment of a user system method 200 for initiating an OAuth session and obtaining and storing an encrypted token in the user system browser. In step 202, the user system sends an authentication request to a service provider (SP), initiating authentication. In step 204, the user system receives an OAuth login page for a required data source/information provider (identity provider) from the service provider redirecting the user to the identity provider that has the data source. By sending the OAuth login page of the identity provider from the service provider server, the application provider redirects the user from the service provider to the identity provider. In step 206, the user system sends login information to the identity provider, and approves OAuth access of the identity provider by the service provider. In step 208, the user system receives an OAuth authorization code from the identity provider (which may be a data source), and an instruction to contact the SP redirecting the user back to the SP. In step 210, the user system sends the OAuth authorization code and user passcode to obtain the access token and the refresh token from the SP, which the SP uses to gain access to the identity provider (the access token is used to obtain an initial access and the renew token is used to refresh the session for subsequent requests for information). In step 212, the user system receives an encrypted refresh token based on the passcode from the SP (the refresh token may be originally generated by the identity provider and sent to the service provider). In step 214, the SP sets the session cookies on the user system with OAuth tokens for subsequent requests. The user system can also store the OAuth tokens in other ways too and send the OAuth tokens back to SP in form of HTTP request headers or in the message body. In step 216, the user system stores the encrypted token in the local storage of the browser.

In an embodiment, each of the steps of method 200 may be a distinct step. In other embodiments, method 200 may not have all of the above steps and/or may have other steps in addition to or instead of those listed above. The steps of method 200 may be performed in another order. Subsets of the steps listed above as part of method 200 may be used to form their own method. In an embodiment, there could be multiple instances of method 200.

Application Provider (SP) Side Method for Conducting an OAuth Session

Figure 2B:
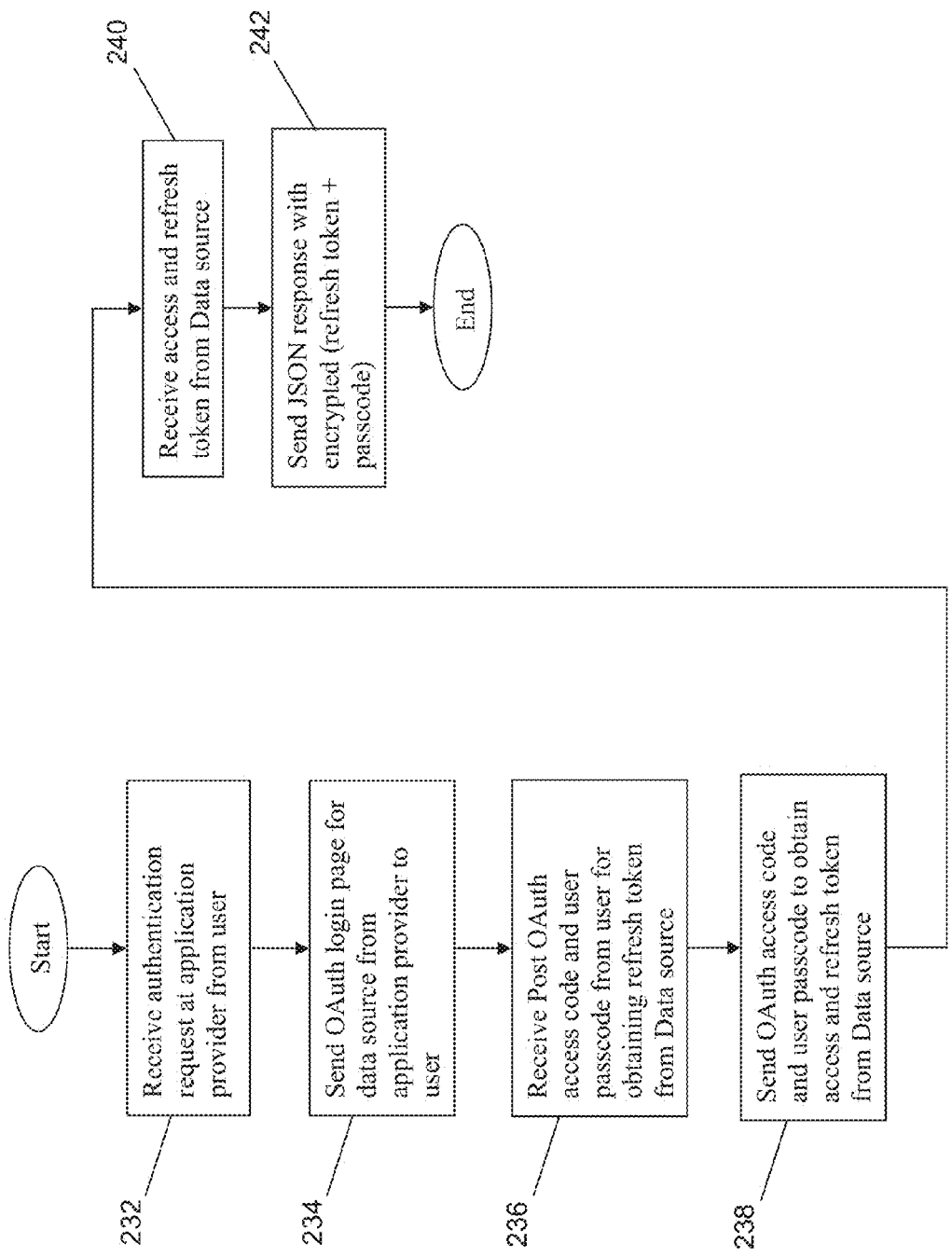
FIG. 2B shows a flowchart of an embodiment of an application provider side method for conducting an OAuth session.

FIG. 2B shows a flowchart of an embodiment of an application provider side method 230 for conducting an OAuth session. In step 232, the service provider (SP) receives an authentication request from the user system. In step 234, the SP sends an OAuth login page for a data source (identity provider) to the user system, redirecting the user to the identity provider. In step 236, the SP receives a post OAuth access code and a user passcode from the user for obtaining a refresh token from the identity provider (which may be a data source) (identity provider). In step 238, the SP sends the OAuth access code and user passcode to obtain the access token and refresh tokens from the identity provider. In step 240, the SP receives the access and refresh tokens from the identity provider. In step 242, the SP sends a Javascript object notation (JSON) response with an encrypted token (based on refresh token+passcode). For example, the token and passcode may be placed into a structured text BLOB, which may then be encrypted. Alternatively, the passcode and token may be concatenated together. Alternatively, the passcode and refresh token may be encrypted separately and then sent within a structured text BLOB or sent separately. JSON is a lightweight text-based open standard designed for human-readable data interchange. JSON is derived from the JavaScript scripting language for representing simple data structures and associative arrays, called objects. Despite JSONs relationship to JavaScript, it is language-independent, are parsers available for most languages. Alternatively, another format may be used for transmitting the access and refress tokens instead of JSON. For example, XML, text, and comma separated values may be used instead of JSON.

In an embodiment, each of the steps of method 230 may be a distinct step. In other embodiments, method 230 may not have all of the above steps and/or may have other steps in addition to or instead of those listed above. The steps of method 230 may be performed in another order. Subsets of the steps listed above as part of method 230 may be used to form their own method. In an embodiment, there may be multiple instances of method 230.

Identity Provider Side Method for Conducting an OAuth Session

FIG. 2C shows a flowchart of an embodiment of a data source (which is identity provider) side method 250 for conducting an OAuth session. In step 252, the data source/information provider (which is identity provider) receives a user login request with an authorization (Auth) access code. In decision step 254, if the access based on the supplied Auth code is denied method 250 follows the NO branch, and the process ends in step 256. In decision step 254, if the access based on the supplied Auth code is approved, method 250 follows the YES branch, and process 250 continues to step 258. In step 258, the identity provider sends the user system redirection instructions to go to the application provider (SP) with the supplied authorization code. In step 260, the identity provider receives the authorization code from the service provider. In decision step 262, if the access based on the supplied auth code is denied method 250 follows the NO branch, and the process ends in step 264. In decision step 262, if the access based on the supplied authorization code is approved, method 250 follows the YES branch, and process 250 continues to step 266. In step 266, the identity provider sends the access and refresh token to service provider and the process steps of method 250 conclude 268.

In an embodiment, each of the steps of method 250 may be a distinct step. In other embodiments, method 250 may not have all of the above steps and/or may have other steps in addition to or instead of those listed above. The steps of method 250 may be performed in another order. Subsets of the steps listed above as part of method 250 may be used to form their own method. In an embodiment, there may be multiple instances of method 250.

Figure 3:
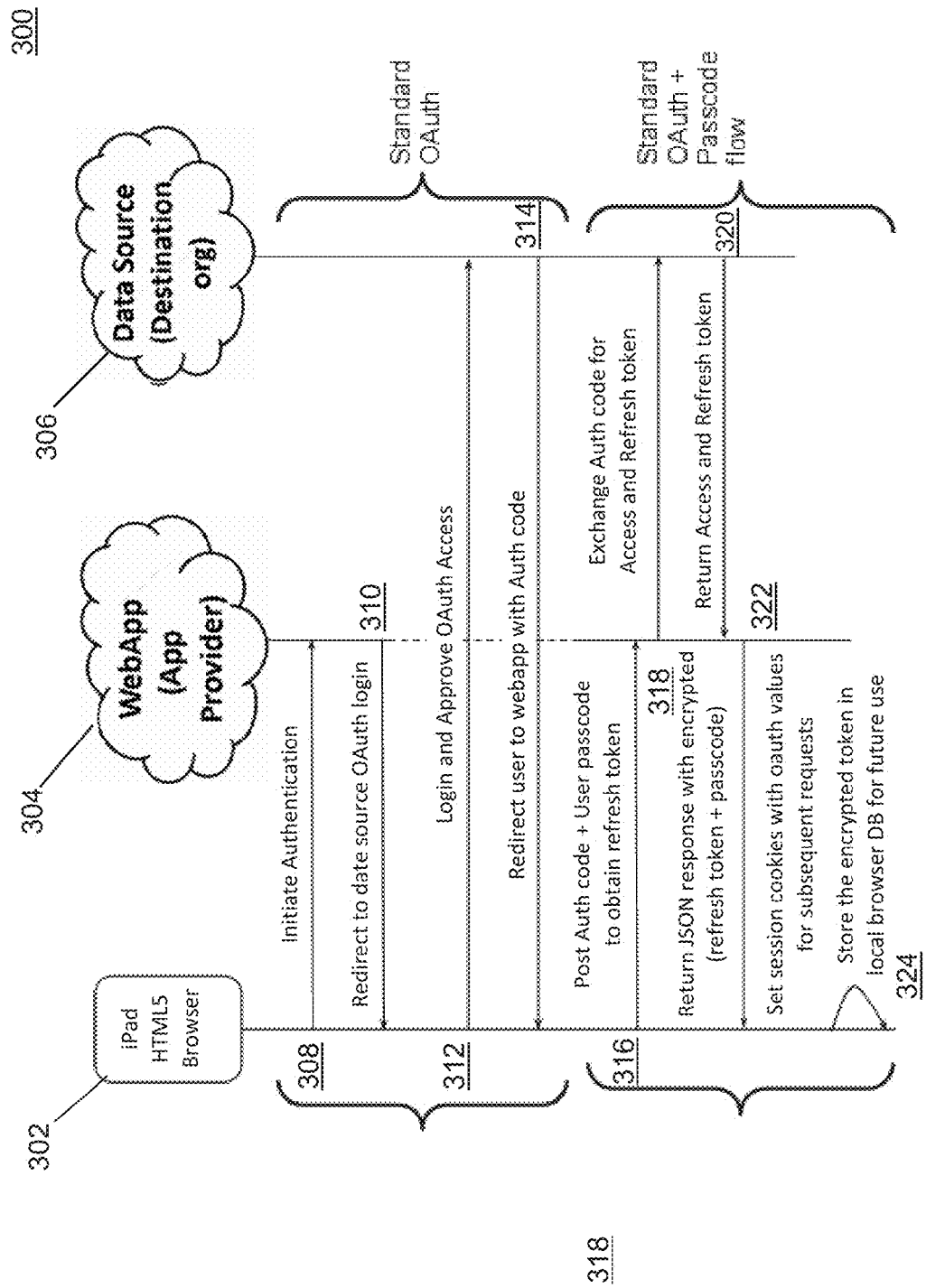
FIG. 3 is an embodiment of a graphical flow representation of the interaction between the user system, application provider, and data source of the flowcharts of FIGS. 2A-2C.
Figure 4A:
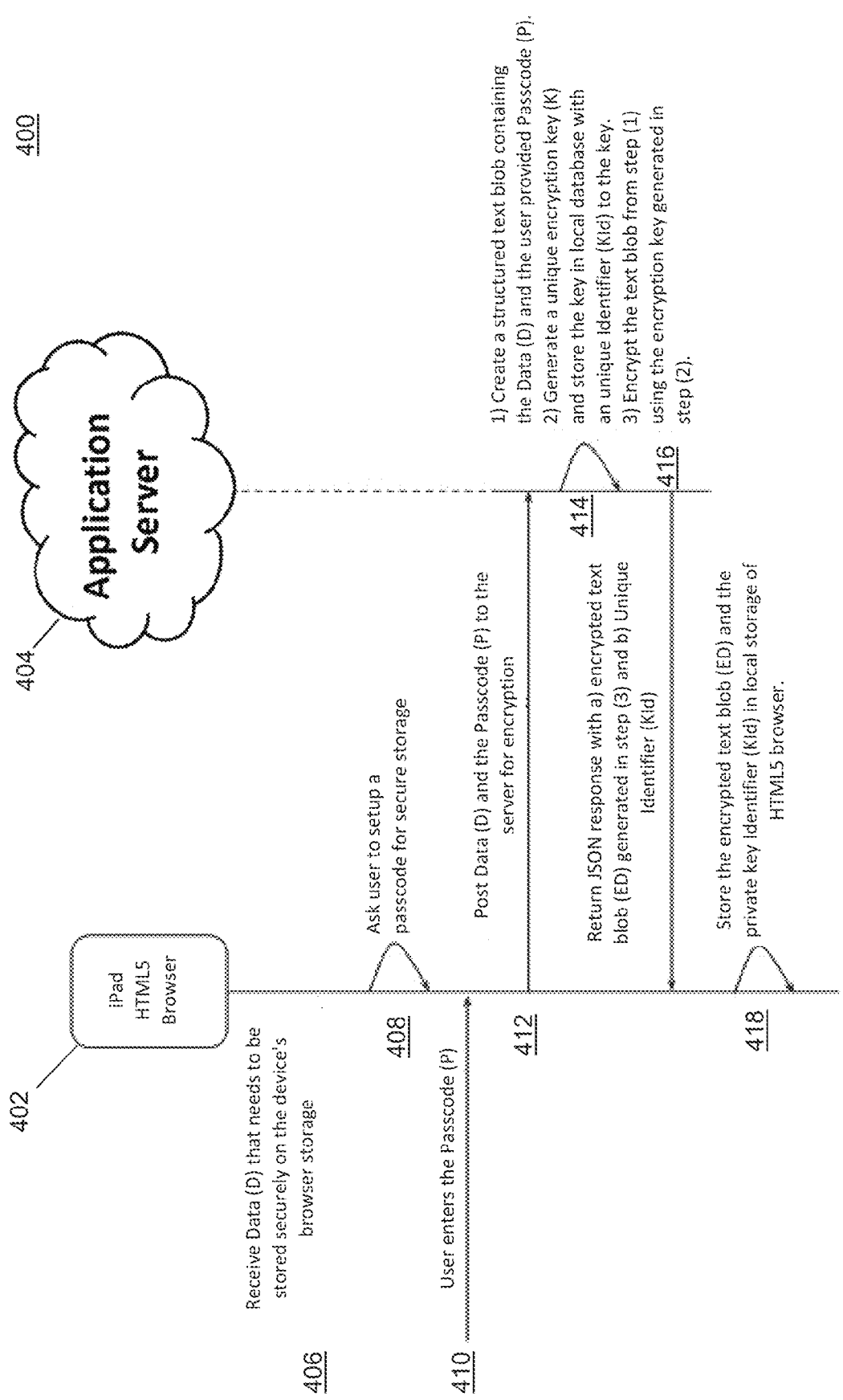
FIG. 4A is an embodiment of a graphical flow representation between a user system browser and an application provider/server illustrating local data storage on the user system browser.
Figure 4B:
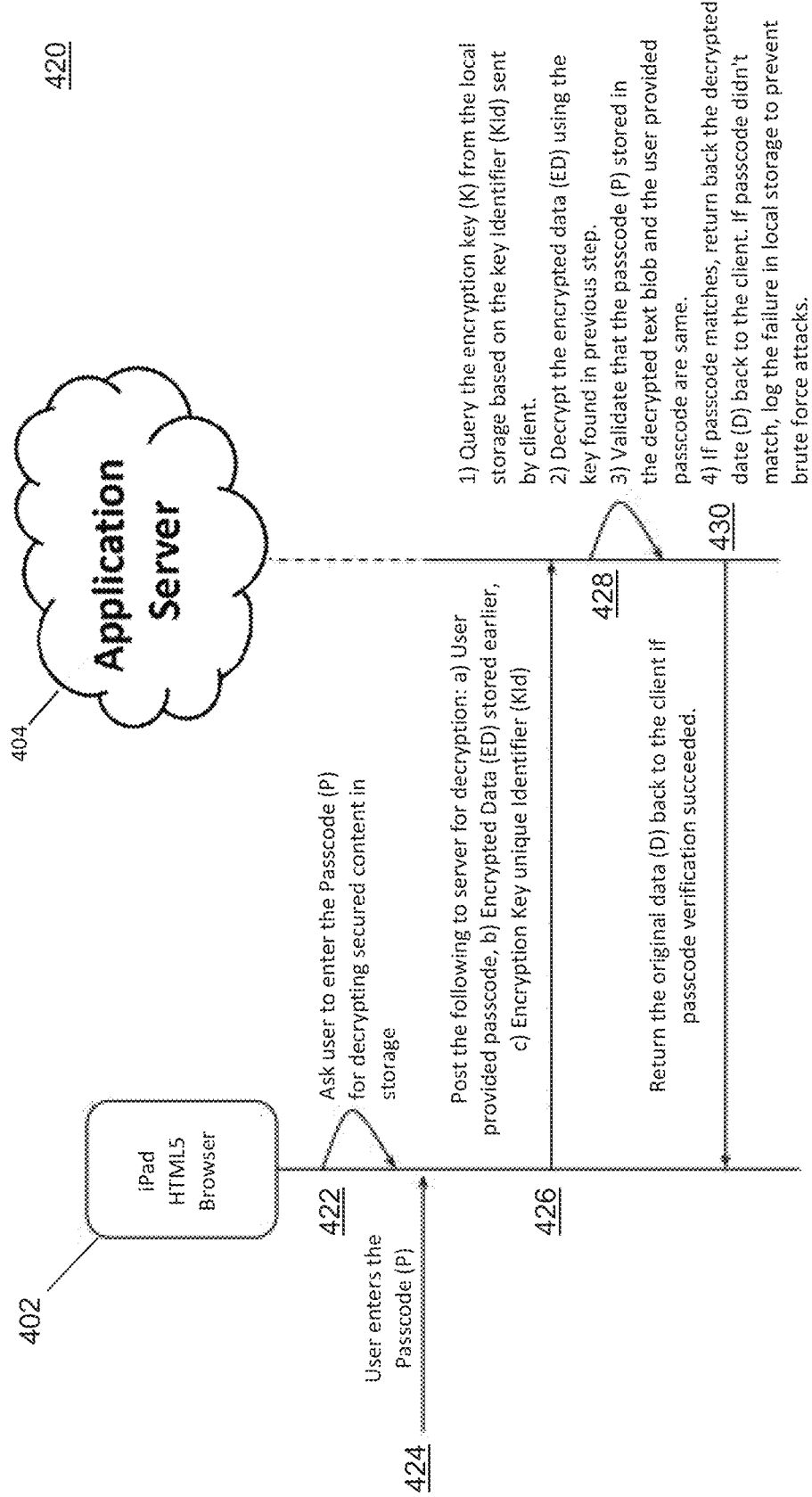
FIG. 4B is an embodiment of a graphical flow representation between the user system browser of FIG. 4A and the application provider/server illustrating the use of the encrypted data stored on the user system browser.
Figure 4C:
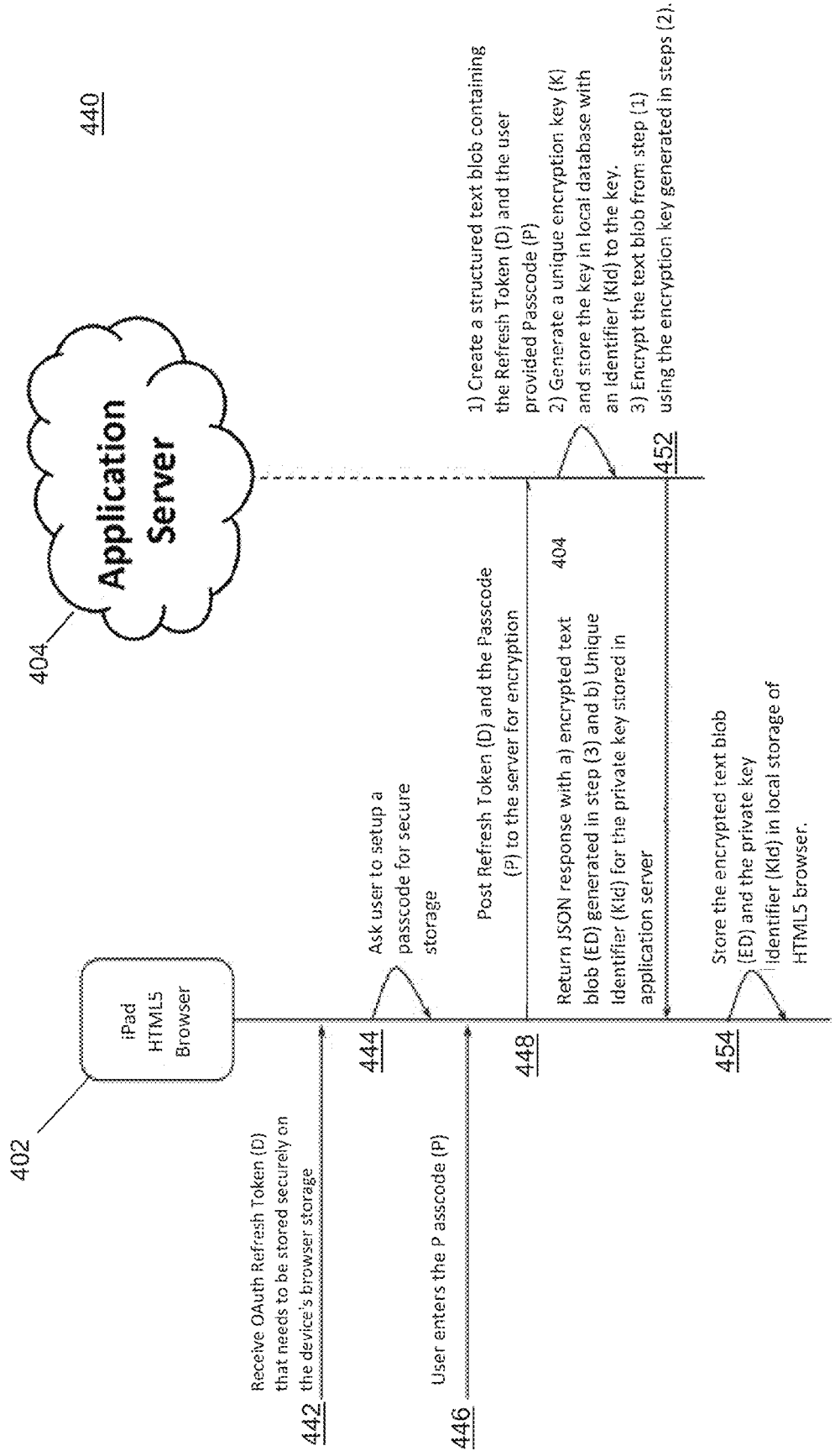
FIG. 4C is an embodiment of a graphical flow representation between the user system browser and the application provider/server, similar to FIG. 4A, but illustrating the secure storage of an OAuth refresh token on the user system browser.
Figure 4D:
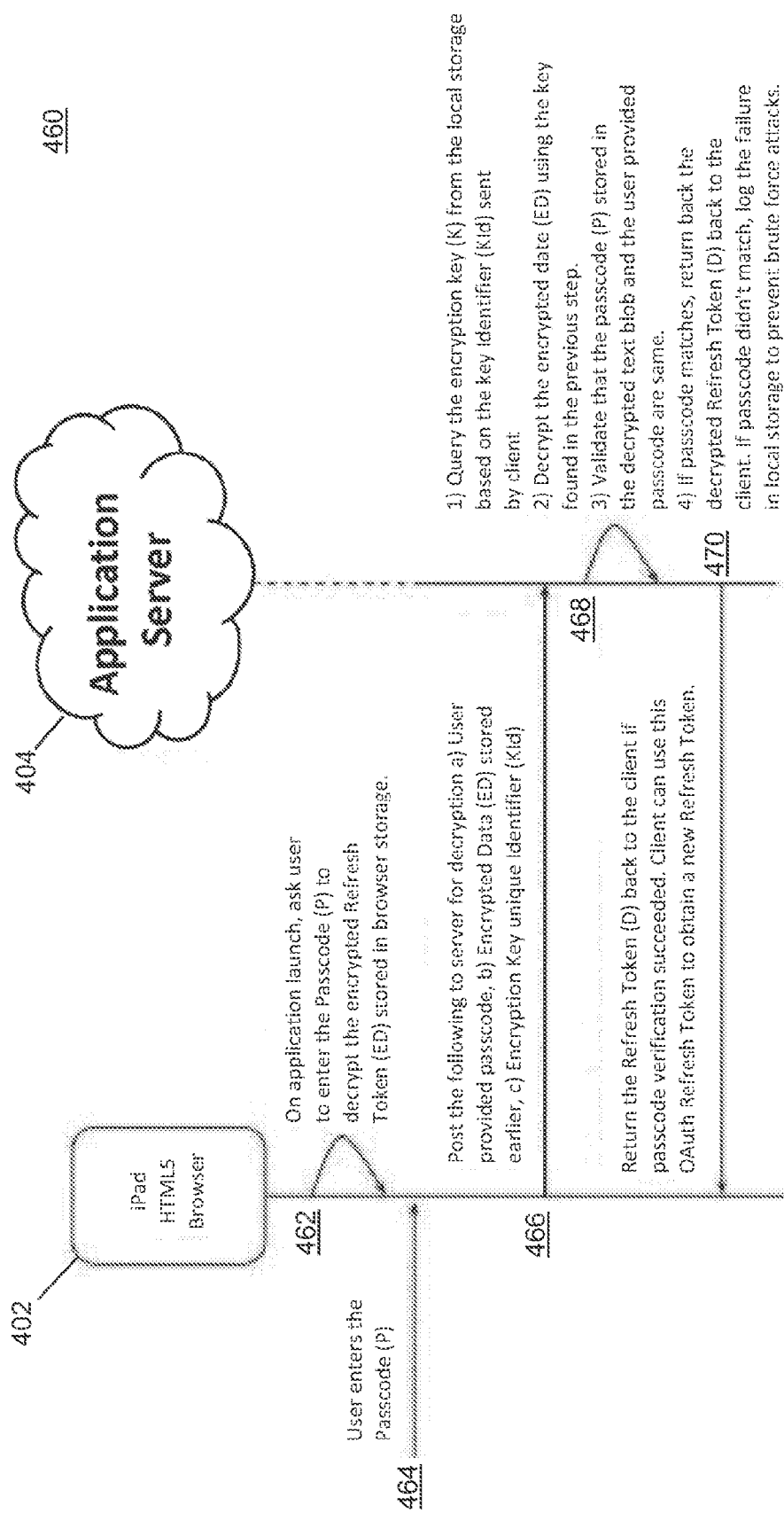
FIG. 4D is an embodiment of a graphical flow representation between the user system browser of FIG. 4C and the application provider/server illustrating obtaining the refresh token in response to receiving the encrypted data stored on the user system browser, similar to FIG. 4B, but using OAuth.
Figure 5A:
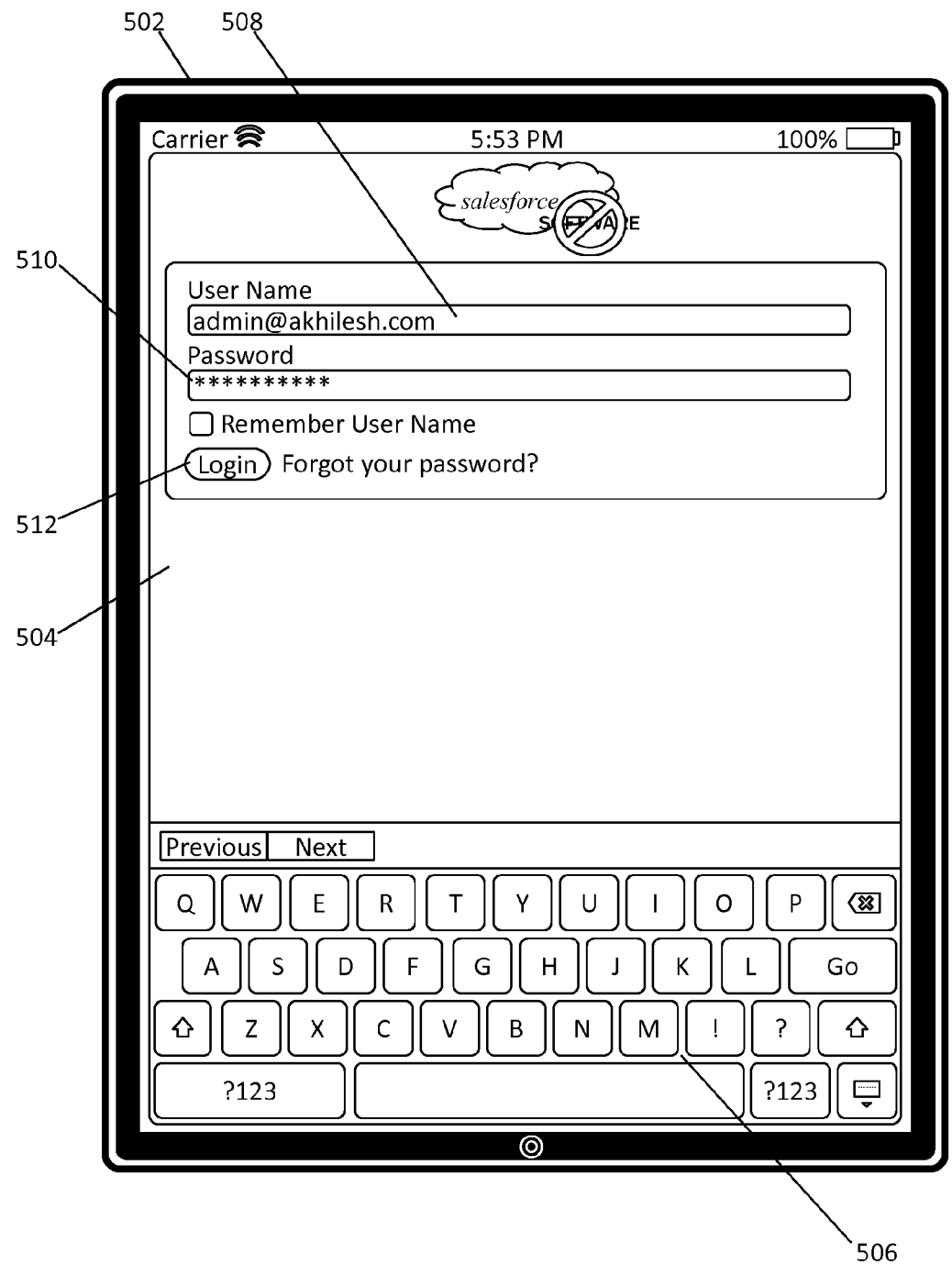
FIGS. 5A-5C are screenshots of an embodiment of a user system display illustrating settings and using a passcode to decrypt a locally stored OAuth refresh token.
Figure 5B:
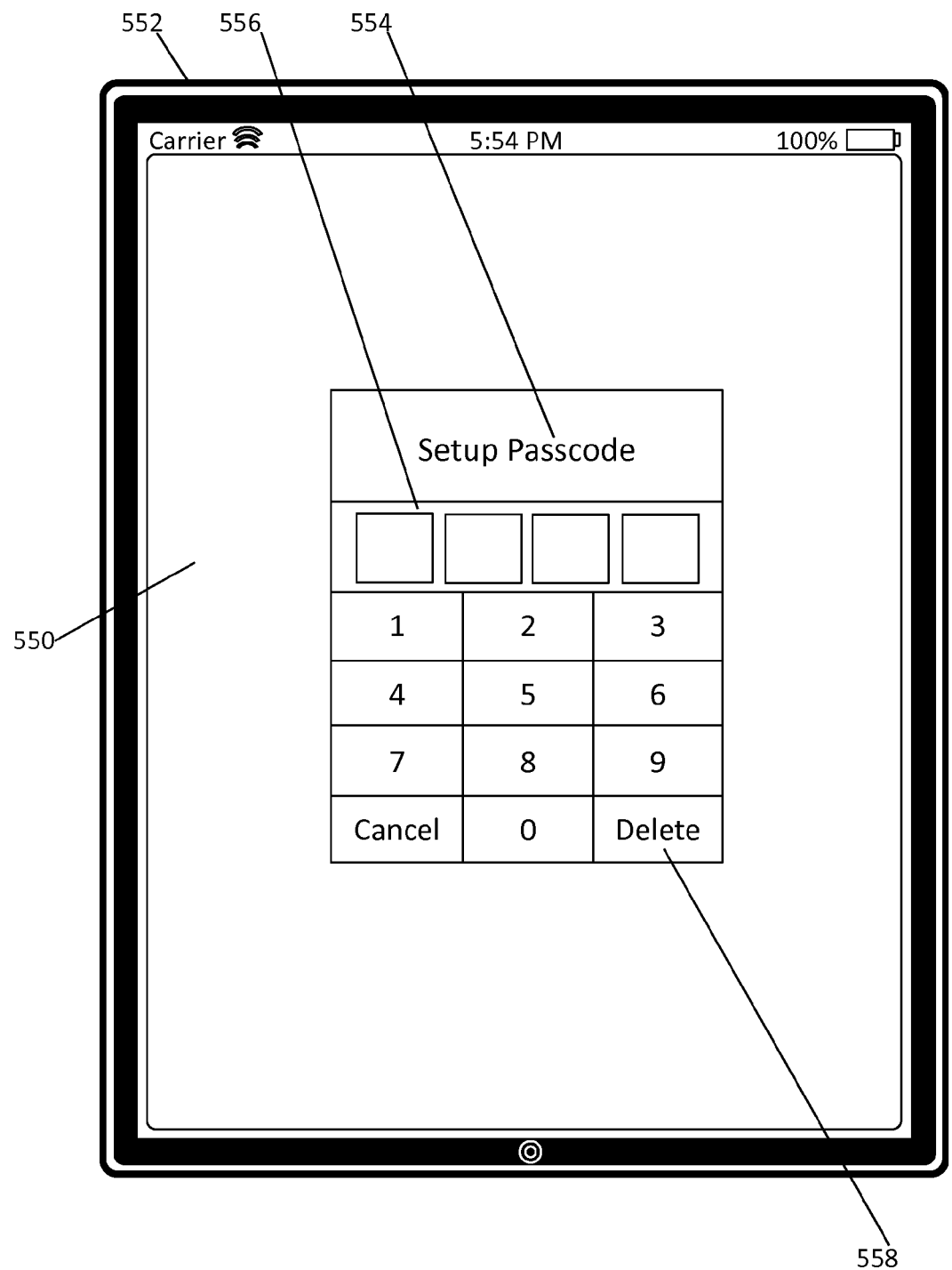
Figure 5C:
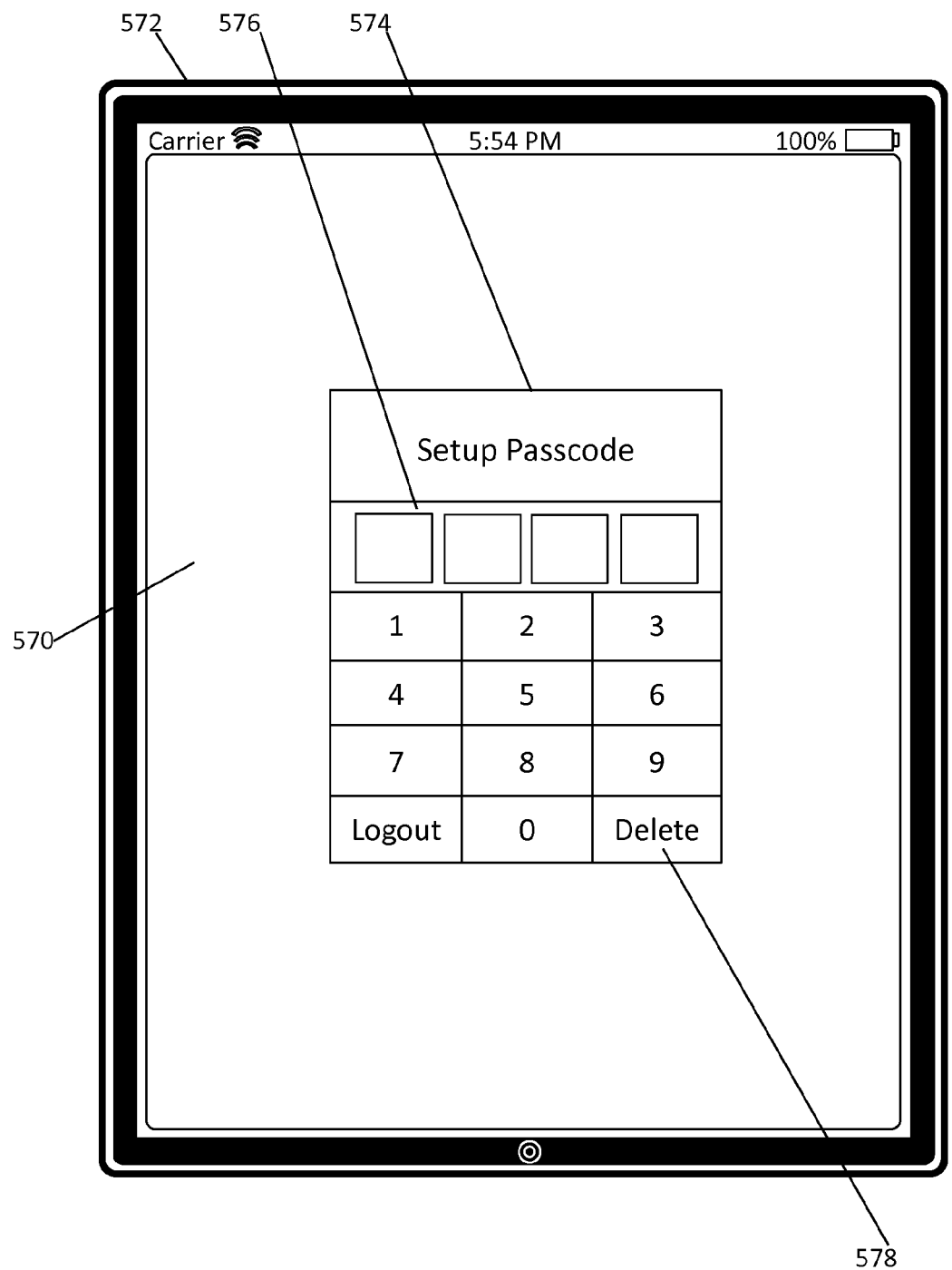
Figure 6:
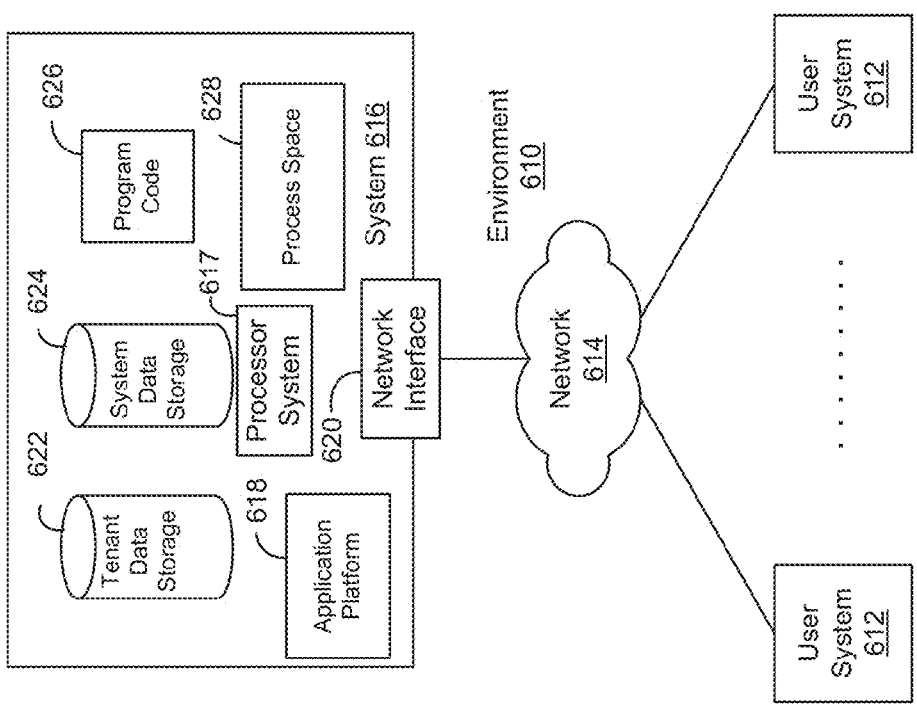
FIG. 6 shows a block diagram of an embodiment of an environment where an on-demand database service might be used for methods and systems for managing OAuth access between user systems, application provider servers, and third party data stored in a multi-tenant database system.
Figure 7:
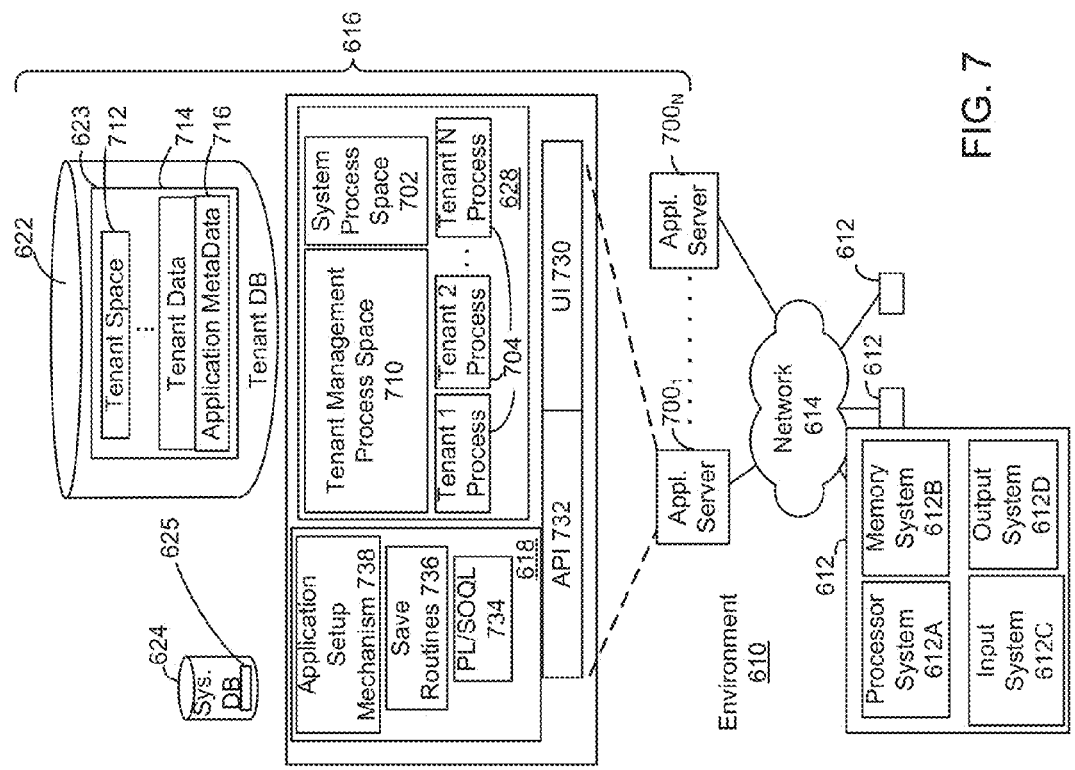
FIG. 7 shows a block diagram of an embodiment of elements of FIG. 6 and various possible interconnections between elements in an embodiment for methods and systems for managing OAuth access between user systems, application provider servers, and third party data stored in a multi-tenant database system.

FIG. 3 is a graphical flow representation 300 of an embodiment illustrating the interaction between the user system 302, application provider (SP) 304, and data source (identity provider) 306 that combines the steps of process 200, 230, and 250, which were described in the flowcharts of FIGS. 2A-2C (in FIGS. 2A-5C "IP" stands for identity provider, whereas elsewhere in the specification, such as in the discussion of FIGS. 6 and 7, "IP" stands for internet protocol). User system 302 may be an embodiment of user system 118. Service provider 304 may be an embodiment of service provider server 104. Identity provider 306 may be an embodiment of identity provider server 110. The user system 302 may be running a browser utilizing hypertext markup language (HTML), such as but not limited to HTML5, and may include a browser that has a database. The flow representation 300 begins with step 308 in which the user system 302 initiates authentication when contacting a Webapp (herein referred to as an application provider/service provider (SP) 304. In step 310, in response to the user system 302, the SP 304 redirects the user system 302 to the data source (identity provider) 306 for OAuth login. During the OAuth login, the user initiates a session at identity provider 306. In step 312, in response to the SP 304, the user system 302 logs into the identity provider 306 and provides an authorization (auth) code. In an embodiment, the authorization code may be a token. In step 314, in response to the user system 302 successfully logging into the identity provider 306 with an accepted auth code, the identity provider 306 redirects the user system 302 to contact the SP 304 with the auth code. In step 316, in response to the SP 304, the user system 302 posts the auth code and a user passcode made up of alphanumeric characters to obtain a refresh token. Subsequently, in step 318, the SP 304 exchanges the supplied authorization code to obtain access and refresh tokens from the identity provider 306, which in an embodiment, may be for the same session opened by the end user in step 310. SP 304 interacts as client with identity provider 306 as a client of identity provider 306. In step 320, the identity provider 306, in response to the SP 304, returns access and refresh tokens to the SP 304. As part of step 320 or step 322, SP 304, encrypts the combination of the refresh token and passcode. For example, the refresh token and passcode may be placed into structured text BLOB, which is then encrypted. In step 322, the SP 304 then returns a JSON response with an encrypted token based on the user supplied passcode combined with the refresh token. In step 324, the browser of user system sets session cookies with OAuth values for subsequent retrieval, and stores the encrypted token in a browser.

In an embodiment, each of the steps of method 300 may be a distinct step. In other embodiments, method 300 may not have all of the above steps and/or may have other steps in addition to or instead of those listed above. The steps of method 300 may be performed in another order. Subsets of the steps listed above as part of method 300 may be used to form their own method. In an embodiment, there may be multiple instances of method 300.

FIGS. 4A and 4B show an example of a method for storing encrypted data on a browser, which may be used with HTML5 or other browsers. FIG. 4A is an embodiment of a graphical flow representation 400 between a user system 402 browser and an application provider/server 404 illustrating the storage of encrypted data on the user system 402 browser. FIG. 4A is a method of storing encrypted data at a browser in a user system. User system 402 may be an embodiment of user system 118 and/or 302. Service provider server 404 may an embodiment of service provider server 104 and/or 304. Identity provider 406 may be an embodiment of identity provider server 110 and/or 306.

The flow representation 400 begins with step 406, in which the user receives data that needs to be stored in the browser of the user system, such as an encrypted refresh token for accessing data on another server, such as the identity server. In other embodiments, another authorization code or other information may be stored at the browser instead. Step 406 has no exact analogue in FIG. 3. However, the encrypted data of the method of FIG. 3, which is the authorization code, is received as part of step 314.

In step 408, the user system 402 receives data (D) (e.g., the refresh token) that is to be stored securely in the user system browser storage. As part of step 408, in order to securely store the data (D), the user is requested to setup a passcode (P) for secure storage.

In step 410, in response to the request, the user enters the passcode (P) into the user system 402. Subsequently, in step 412, the data (D) (e.g., the refresh token) and passcode (P) are posted or sent to the service provider server (SP) for encryption.

In step 414, upon receiving the data (D) and passcode (P), the service provider server 404 may perform the following sub-steps. In sub-step (1), service provider server 404 creates a structured text Binary Large Object (BLOB) (e.g., places the data and the user passcode into to the structured text BLOB, thereby creating a structured text BLOB containing the data (D) (e.g., the refresh token) and the user provided passcode (P). In sub-step (2), service provider server 404 generates a unique encryption key (K), and stores the key in a local SP database with a unique identifier (Kid) assigned to the key assuming that the encryption and decryption key are the same (if the encryption and decryption key are different, then the decryption key is stored at the SP database—or other storage area—in association with key identifier Kid).

In sub-step (3), service provider server 404 encrypts the text blob, which may be referred to as ED (Encrypted Data) from sub-step (1) using the encryption key generated in step (2).

In an embodiment, a one-way hash is performed on only the passcode before encrypting the passcode along with the content or token (which may be plain text). So next time user provides the passcode, the stored hash of the passcode is compared with the new one-way hash of the provided passcode (instead of comparing the plain-text passcodes). In an embodiment, the server only stores the encryption keys but not the encrypted content. So the user sends the unencrypted passcode and the encrypted object, to allow server to match the passcodes, and if successful, the server returns the unencrypted content using the key stored at server. In an embodiment, the passcode is not part of "content" but instead stored along with content in the resulting encrypted object.

In step 416, the service provider server 404 subsequently returns a structured response, such as JSON, XML etc., with a) encrypted text blob (ED) generated in sub-step (3) of step 414 to the user system 402, and (b) returns the unique identifier for the private key (which may be referred to as the Key identifier (Kid)) stored in the SP to the user system 402.

In step 418, the received encrypted text blob (ED) and the private key identifier (Kid) are stored in local storage of the user system 402 browser. Steps 408, 410, 412, and 418 of FIG. 4A correspond to steps 310, 312, 314, 316, 322, and 324, respectively, of FIG. 3. Step 414 corresponds to steps 318 and 320. The method of FIGS. 3 and 4A differ in that in FIG. 3, the encrypted data is received as part of the step 314, when the user system is redirected to the webpage of the SP, which occurs after being asked to set up a passcode in step 312, whereas in the method of FIG. 4A, the user is asked to set the passcode in step 410, which occurs after receiving the encrypted data (D)/authorization code in step 406.

In an embodiment, each of the steps of method 400 may be a distinct step. In other embodiments, method 400 may not have all of the above steps and/or may have other steps in addition to or instead of those listed above. The steps of method 400 may be performed in another order. Subsets of the steps listed above as part of method 400 may be used to form their own method. In an embodiment, there may be multiple instances of method 400.

FIG. 4B is an embodiment of a graphical flow representation 420 between the user system 402 of FIG. 4A and the service provide server 404. FIG. 4A is method of using of the encrypted data stored on the browser of the user system (which may have been stored using the method 400 of FIG. 4A).

In step 422, the graphical flow representation 420 begins with the user being prompted to enter the passcode (P), which may have been created in FIG. 4A. The passcode may ultimately be used by the service provider server 404 for decrypting encrypted content that is in the browser storage. In an embodiment, the encrypted content may be a refresh token. However, in other embodiments, the encrypted content may be other encrypted content that service provider server 404 needs from user system 402 that is stored in the user system. In an embodiment, the passcode is requested from the user upon launching an application running on or provided by service provider server 404. In other embodiments, the secure content may not be needed immediately, and the passcode may be requested at a later time.

In response, in step 424, the user enters the passcode (P) on the user system 402. Subsequently, in step 426, the following are posted or sent by the user system 402 to the service provider server 404 for performing the decryption: a) the user provided passcode (P); b) encrypted data (ED) stored in FIG. 4A (e.g., the encrypted refresh token); and c) the encryption key unique identifier (Kid).

In step 428, upon receiving the ED and Kid from the user system 402, the service provider server 404 performs the following sub-steps. In sub-step (1) the service provider server 404 queries the encryption key (K) from the local storage based on the key identifier (Kid) sent by the user (the client). In other words, service provider server 404 performs a search (e.g., via a query statement) in the local storage of the browser of the user system for the encryption key, and the Kid is used as the lookup value (e.g., database key) to locate the encryption key. In sub-step (2) the service provider server 404 decrypts the encrypted data (ED) using the key found in step 1. In sub-step (3) the service provider server 404 validates that the passcode (P) stored in the decrypted text blob (ED), and the user provided passcode (P) are the same. In sub-step (4) if the passcodes match in sub-step 3, the decrypted data (D) is returned back to the user system 402 by the service provider server 404, and if the passcodes do not match, a failure is logged in local storage of the service provider server 404 to prevent brute force attacks. For example, the SP may only allow a predetermined particular number of failed attempts to gain access, and if the log indicates that the predetermined particular number of failed attempts is exceeded, the SP may block access from that user whether or not the user later provides the correct passcode. In other words, the logging of failure attempts can limit how many failures are allowed before the decryption of that token is disabled and the system determines to no longer accept the encryption keys. After the system determines to no longer accept the encryption keys the user would then have to re-authenticate and store new data that's encrypted with new private key.

In step 430, optionally, after the service provider server 404 may receive updated data (e.g., an updated refresh token that was obtained using the original refresh token), the updated data is encrypted and is sent back to the user system 402 by the service provider server 404 if the passcodes verification is successful. As part of step 430, optionally, service provider server 404 may make use of the encrypted data to provide a service to the user system.

In an embodiment, each of the steps of method 420 may be a distinct step. In other embodiments, method 420 may not have all of the above steps and/or may have other steps in addition to or instead of those listed above. The steps of method 420 may be performed in another order. Subsets of the steps listed above as part of method 420 may be used to form their own method. In an embodiment, there may be multiple instances of method 420.

FIG. 4C is an embodiment of a graphical flow representation 440 between the browser of user system 402 and the application provider/service provider server 404, similar to FIG. 4A, but illustrating the secure storage of an OAuth refresh token on the user device browser. The graphical flow representation 440 begins with the user system 402 receiving an OAuth refresh token (D) that requires secure storage on the user systems 402 browser (step 442), and the user being prompted or asked to setup a passcode for secure storage (step 444). Subsequently, the user enters the passcode (P) (step 446) and posts or sends the refresh token (D) and the passcode (P) to the application server (SP) for encryption (step 448). Upon receiving the refresh token (D) and the passcode (P) from the user system 402, the service provider server 404: 1) creates a structured text blob containing the refresh token (D) and the user provided passcode (P); 2) generates a unique encryption key (K) and stores the key in a SP local database with a unique identifier (Kid) assigned to the key; and 4) encrypts the text blob from step (1) using the encryption key generated in step (2) (step 450). The service provider server 404 subsequently returns a JSON response with a) encrypted text blob (ED) generated in step (3) of step 450 to the user system 402, and (b) returns the unique identifier (Kid) for the private key stored in the service provider server 404 to the user system 402 (step 452). The received encrypted text blob (ED) and the private key identifier (Kid) are stored in local storage of the user system 402 browser (step 454).

In an embodiment, each of the steps of method 440 may be a distinct step. In other embodiments, method 440 may not have all of the above steps and/or may have other steps in addition to or instead of those listed above. The steps of method 440 may be performed in another order. Subsets of the steps listed above as part of method 440 may be used to form their own method. In an embodiment, there may be multiple instances of method 440.

FIG. 4D is an embodiment of a graphical flow representation 460 between the user system 402 browser of FIG. 4C and the service provider server 404 illustrating obtaining the refresh token in response to the encrypted data stored on the user system 402 browser, similar to FIG. 4B, but using OAuth. Flow representation begins 460 when the application on service provider server 404 is started or requested by the user, and the user is prompted to enter the passcode (P) to decrypt the encrypted refresh token (ED) that has been already stored in storage belonging to the browser (step 462). In response, the user enters the passcode (P) (step 464), and posts or sends the following to the SP for decryption: a) user provided passcode (P); b) encrypted data (ED) stored earlier as in FIG. 4C; and c) the encryption key unique identifier (Kid) (step 466). Upon receiving the ED and Kid from the user device 402, the service provider server 404: 1) queries the encryption key (K) from the local storage based on the key identifier (Kid) sent by the user (client); 2) decrypts the encrypted data (ED) using the key found in step 1; 3) validates that the passcode (P) stored in the decrypted text blob (ED), and the user provided passcode (P) are the same; and 4) if the passcodes match in step 3, the decrypted data (D) is returned back to the user system 402, if the passcodes do not match, a failure is logged in local storage of the service provider server 404 to prevent brute force attacks (step 448). Subsequently, the SP returns the refresh token (D) back to user system 402 client if the passcode verification was successful. The client or user can use the OAuth refresh token to obtain a new refresh token (step 470).

In an embodiment, each of the steps of method 460 may be a distinct step. In other embodiments, method 460 may not have all of the above steps and/or may have other steps in addition to or instead of those listed above. The steps of method 460 may be performed in another order. Subsets of the steps listed above as part of method 460 may be used to form their own method. In an embodiment, there may be multiple instances of method 460.

In the embodiment of FIGS. 4A-D the token is decrypted and the decrypted token is returned to the user, whereas in the embodiment of FIG. 3, the token is used by the SP to access information at the IP. In other embodiments, the decrypted token may be sent elsewhere. In the embodiment of FIG. 4, the encrypted tokens are decrypted on the application server side.

In the embodiment of FIG. 3, after logging into the SP, the user is redirected to provide the authorization code directly to the IP, but in the embodiment of FIGS. 4A-D, after logging in, the user is asked to provide a passcode without necessarily being redirected to the IP. The embodiment of FIG. 3 may include two parts: a) Standard OAuth, b) Standard OAuth+ Passcode flow. The embodiments of FIGS. 4A and C represents the part (b) of the embodiment of FIG. 3. Whereas, the embodiment of FIGS. 4B and D show how the encrypted tokens are decrypted later.

The user system uses the decrypted refresh token for subsequent data requests via API from the identity provider system. The user system may use the decrypted data in any way the user wants. In an embodiment, the user does not store the decrypted data locally for security reasons, only the encrypted data is stored locally by the user system to prevent the loss of data due to theft.

The embodiment of FIGS. 4A and B is a way to store the data securely on the browser of the user system. The use of OAuth is optional, but just a use case which may benefit from the process of how the encrypted tokens are decrypted on the application server side.

FIG. 5A is screen shot 500 of an embodiment of a webpage for an initial login. Webpage 502 may include virtual keyboard 506, username field 508, password field 510, and login button 512. In other embodiments, webpage 502 may not have all of the elements listed and/or may have other elements instead of or in addition to those listed.

Webpage 502 may used by the user for initially logging into service provider's website. Virtual keyboard 506 may be used for entering the password and username in the appropriate fields. Alternatively, the user may use a physical keyboard, if one is available. Username field 508 is the field into which the user enters the username, which identifies the user to the service provider. Password field 510 is a field for entering a password for gaining access to the user's account at the service provider's server. Login button 512 may be depressed to send the password and user name for authentication. In the embodiment, after the service provider authenticates the username and password, the user is asked to provide a passcode for decrypting stored content. In another embodiment, the user may be redirected to the identity provider's server for logging in and approving access.

FIG. 5B is a screenshot 550 of an embodiment of a webpage 552 for setting a passcode or for re-entering a passcode. Webpage 552 may include action identifier 554, passcode field 556, and virtual keyboard 558. In other embodiments, webpage 552 may not have all of the elements listed and/or may have other elements instead of or in addition to those listed.

After login, a user or client receives an OAuth refresh token that may require storage locally on the user device for future use. The passcode which may be entered through the interface webpage 552 is used, at least in part, to encrypt the refresh token. The passcode may be setup once and reused in future logins and authentication as will be shown in FIG. 5C, below. Webpage 552 may include, action identifier 554 identifies the action that is being performed, which, in screenshot 550 of FIG. 5B, is setting up a passcode. Passcode field 556 is for entering the passcode, which will be used encrypting the referesh token and/or authentication. Virtual keyboard 558 is an interactive portion of the display that has icons for buttons, which may be used for entering the passcode. The portion of the display having Virtual keyboard 558 may also display information to a user for informing the user of which values are acceptable values for use as characters of the passcode. Although virtual keyboard 558 only includes the digits 1-9, in other embodiments other symbols may be used instead and/or in addition to the digits 1-9.

Webpage 552 may be used by the user for setting up a passcode, which may be used for encrypting the stored refresh token and for logging into service provider's website. Action identifier 554 informs the user of which information is to be inputted, which in FIG. 5B is the passcode. Passcode field 556 provides the user with a visual cue during entry of the passcode. Virtual keyboard 558 may be used for entering the passcode in the appropriate fields. Alternatively, the user may use a physical keyboard, if one is available/desired.

FIG. 5C is a screen shot 570 of an embodiment of a webpage 572 for entering a passcode. Webpage 572 may include, action identifier 574, passcode field 576, and virtual keyboard 578. In other embodiments, webpage 552 may not have all of the elements listed and/or may have other elements instead of or in addition to those listed.

Webpage 572 may be used by the user for entering a passcode, which may be used for decrypting the stored refresh token and for logging into service provider's website. Whenever the user re-launches the application, the user is prompted for the passcode (P) that was initially entered (as shown in FIG. 5B) to decrypt the locally stored OAuth Refresh token. Passcode field 576 and virtual keyboard 578 of FIG. 5C may be the same as Passcode field 556 and virtual keyboard 558, respectively. Action identifier 576 is similar to action identifier 556, except that the action identified by action identifier 576 is entering a passcode (whereas the action identified for action identifier 558 was setting up the passcode). In other words, action identifier 574 informs the user of which information is to be inputted, which in FIG. 5C is the passcode (as set up in FIG. 5B).

System Overview

FIG. 6 illustrates a block diagram of an environment 610 wherein an on-demand database service might be used. Environment 610 may include user systems 612, network 614, system 616, processor system 617, application platform 66, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 may be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 66 may be a framework that allows the applications of system 616 to run, such as the hardware and/or software, e.g., the operating system. In an embodiment, on-demand database service 616 may include an application platform 66 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616 that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, HTTPS, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 66, which manages creation, storage of the applications into one or more database objects and executing of the applications in a virtual machine in the process space of the system 616.

One arrangement for elements of system 616 is shown in FIG. 6, including a network interface 620, application platform 66, tenant data storage 622 for tenant data 1923, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device may be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 6 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 6, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which may be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 1900 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also may be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., may be maintained and accessed by a user system having nothing more than network access, the user may manage his or her sales efforts and cycles from any of many different user systems. For example, if a salesperson is visiting a customer and the customer has Internet access in their lobby, the salesperson may obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database may generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/8128, 161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Method for Using the Environment (FIGS. 6 and 7)

Figure 8:
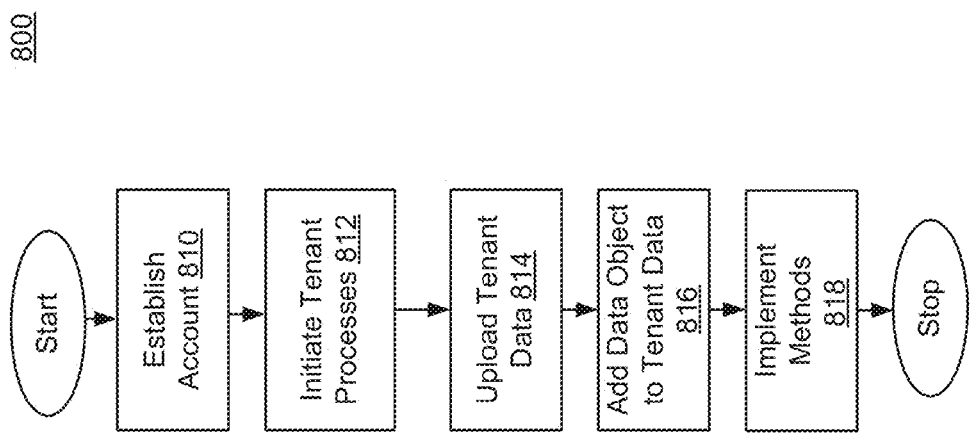
FIG. 8 shows a flowchart of an example of an embodiment of a method for using the environment of FIG. 6.

FIG. 8 shows a flowchart of an example of a method 800 of using environment 610. In step 810, user system 612 (FIGS. 6 and 7) establishes an account. In step 812, one or more tenant process space 704 (FIG. 7) are initiated on behalf of user system 612, which may also involve setting aside space in tenant space 712 (FIG. 7) and tenant data 714 (FIG. 7) for user system 612. Step 812 may also involve modifying application metadata to accommodate user system 612. In step 814, user system 612 uploads data. In step 816, one or more data objects are added to tenant data 714 where the data uploaded is stored. In step 818, the methods associated with FIGS. 6-7 may be implemented. In another embodiment, although depicted as distinct steps in FIG. 8, steps 810-818 may not be distinct steps. In other embodiments, method 800 may not have all of the above steps and/or may have other steps in addition to, or instead of, those listed above. The steps of method 800 may be performed in another order. Subsets of the steps listed above as part of method 800 may be used to form their own method.

Method for Creating the Environment (FIGS. 6 and 7)

Figure 9:
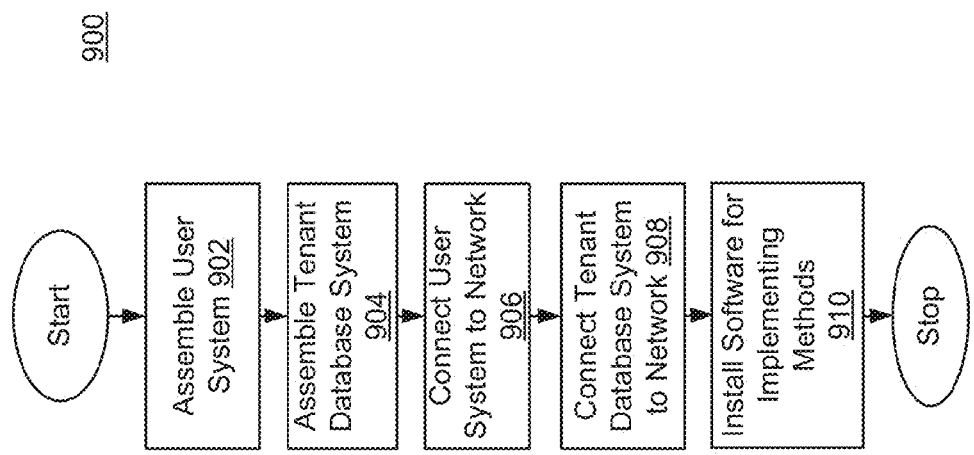
FIG. 9 shows a flowchart of an example of an embodiment of a method of making the environment of FIG. 6.

FIG. 9 is a method of making environment 610, in step 902, user system 612 (FIGS. 6 and 7) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 904, system 616 (FIGS. 6 and 7) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 616 may include installing application platform 618, network interface 620, tenant data storage 622, system data storage 624, system data 625, program code 626, process space 628, UI 730, API 732, PL/SOQL 734, save routine 736, application setup mechanism 738, applications servers 700$_1$-700$_N$, system process space 702, tenant process spaces 704, tenant management process space 710, tenant space 712, tenant data 714, and application metadata 716 (FIG. 7).

In step 906, user system 612 is communicatively coupled to network 614. In step 908, system 616 is communicatively coupled to network 614 allowing user system 612 and system 616 to communicate with one another (FIG. 7). In step 910, one or more instructions may be installed in system 616 (e.g., the instructions may be installed on one or more machine readable media, such as computer readable media, therein) and/or system 616 is otherwise configured for performing the steps of methods associated with FIGS. 2-5. In an embodiment, each of the steps of method 900 is a distinct step. In another embodiment, although depicted as distinct steps in FIG. 9, steps 902-910 may not be distinct steps. In other embodiments, method 900 may not have all of the above steps and/or may have other steps in addition to, or instead of, those listed above. The steps of method 900 may be performed in another order. Subsets of the steps listed above as part of method 900 may be used to form their own method.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

EXTENSIONS AND ALTERNATIVES

In this specification anywhere a JSON is mentioned, XML, a comma separated value file, text, or another format may be used for storing the same data. Any place the structured text BLOB is mentioned another data structure may be used instead. Alternatively, instead of placing the passcode and token into the structured text BLOB and then encrypting the structured text BLOB, the passcode and token may be concatenated together and then encrypted, may be encrypted and then placed into a structured text BLOB (or other data structure), or sent separately.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A nontransient machine readable medium storing one or more machine instructions, which when invoked cause a processor to implement a method comprising:
 at a server that includes at least a processor system having at least one processor and a memory system, receiving a passcode and content, to be used by a service provider server on behalf of the user;
 if the passcode is authenticated, wherein authenticating the pass code comprises determining whether the passcode stored with the content and a passcode provided by a user previously match one another, performing the following,
  placing, by the server, the content and passcode into an object;
  creating, by the server, an encryption key;
  encrypting, by the server, the object having the content and the passcode with the encryption key, therein forming an encrypted object; and
 sending from the server to the user system the encrypted object and a unique identifier for the private key.

2. The nontransient machine readable medium of claim 1, the object including at least a Binary Large Object (BLOB), the method further comprising converting the content and passcode into binary format and placing the passcode and content that were converted into the BLOB.

3. The nontransient machine readable medium of claim 1, the object including at least a file.

4. The non-transitory machine readable medium of claim 3, the encrypting of the content and passcode yielding a result that is saved as plain text in the object.

5. A non-transitory machine readable medium storing one or more machine instructions, which when invoked cause a processor to implement a method comprising:
 at a server that includes at least a processor system having at least one processor and a memory system, receiving a passcode and content, to be used by a service provider server on behalf of the user;
 if the passcode is authenticated, wherein authenticating the pass code comprises determining whether the passcode stored with the content and a passcode provided by a user previously match one another, performing the following,
  placing, by the server, the content and passcode into an object;
  creating, by the server, an encryption key;
  encrypting, by the server, the object having the content and the passcode with the encryption key, therein forming an encrypted object; and
 sending from the server to the user system the encrypted object and a unique identifier for the private key;
 the encrypting of the passcode including at least applying a one-way hash function to the passcode.

6. The nontransient machine readable medium of claim 1, the method further comprising: storing the content and passcode that were encrypted in a local database at the server.

7. The nontransient machine readable medium of claim 6, the content being a token for refreshing an access to another server.

8. The nontransient machine readable medium of claim 6, the method further comprising:
 sending the content from the server to another server; and
 in response to the sending, receiving a token from the other server.

9. A nontransient machine readable medium storing one or more machine instructions, which when invoked cause a processor to implement a method comprising:
 receiving, at a server that includes at least a processor system having at least one processor and a memory system, a passcode and encrypted content to be used by a service provider server on behalf of the user and a unique key identifier;
 in response to the receiving, performing the following,
  querying a local database for the encryption key based on the key identifier;
  decrypting the encrypted content with the key;
  determining whether the passcode stored previously with the content and the passcode provided by the user match one another; and
  returning the decrypted content to the user if the passcode that was stored with the content and the passcode provided by the user match one another;

wherein prior to the receiving of the encrypted passcode and encrypted content and a unique key identifier, receiving at the server, from a user device, the content and the passcode for encryption;

in response, creating, by the server, a file;

placing, by the server, the passcode and content in the file, generating, by the server, a unique encryption key and unique identifier of the key, storing in a storage location of the memory system the unique encryption key in association with a unique identifier, encrypting, by the server, the file in which the pass code and content were placed with the unique encryption key, therein creating the encrypted passcode and the encrypted content;

sending from the server to the user device the encrypted file and the unique key identifier for storage at the user device.

10. The nontransient machine readable medium of claim 9, the method further comprising creating a log of the receiving, of the encrypted passcode if the passcode decrypted and the passcode provided by the user do not match one another.

11. The non-transitory machine readable medium of claim 1, the method further comprising:

the encrypting of the passcode including at least applying a one-way hash function to the passcode.

12. A non-transitory machine readable medium storing one or more machine instructions, which when invoked cause a processor to implement a method comprising:

at a server that includes at least a processor system having at least one processor and a memory system, receiving a passcode and content, to be used by a service provider server on behalf of the user;

if the passcode is authenticated, wherein authenticating the pass code comprises determining whether the passcode stored with the content and a passcode provided by a user previously match one another, performing the following, placing, by the server, the content and passcode into an object;

creating, by the server, an encryption key;

encrypting, by the server, the object having the content and the passcode with the encryption key, therein forming an encrypted object; and sending from the server to the user system the encrypted object and a unique identifier that identifies the private key.

* * * * *